(12) United States Patent
Sakamoto

(10) Patent No.: US 12,485,451 B2
(45) Date of Patent: Dec. 2, 2025

(54) TACTILE DEVICE

(71) Applicant: Magnolia White Corporation, Tokyo (JP)

(72) Inventor: Michiaki Sakamoto, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 931 days.

(21) Appl. No.: 17/655,242

(22) Filed: Mar. 17, 2022

(65) Prior Publication Data

US 2022/0203402 A1    Jun. 30, 2022

Related U.S. Application Data

(63) Continuation of application No. PCT/JP2020/030445, filed on Aug. 7, 2020.

(30) Foreign Application Priority Data

Sep. 20, 2019    (JP) ................................. 2019-171760

(51) Int. Cl.
*B06B 1/06* (2006.01)
*B06B 1/02* (2006.01)
(Continued)

(52) U.S. Cl.
CPC .............. *B06B 1/06* (2013.01); *B06B 1/0207* (2013.01); *G06F 3/0445* (2019.05); *H10N 30/20* (2023.02); *H10N 30/87* (2023.02)

(58) Field of Classification Search
CPC ........... B06B 1/06; H10N 30/20; H10N 30/87
(Continued)

(56) References Cited

U.S. PATENT DOCUMENTS

| | | | |
|---|---|---|---|
| 2012/0105333 A1* | 5/2012 | Maschmeyer | ........ G06F 3/016 345/173 |
| 2014/0265624 A1 | 9/2014 | Ichikawa et al. | |
| 2018/0309042 A1 | 10/2018 | Johnson et al. | |

FOREIGN PATENT DOCUMENTS

| | | |
|---|---|---|
| JP | 2012-27765 A | 2/2012 |
| JP | 2014-170266 A | 9/2014 |
| | (Continued) | |

OTHER PUBLICATIONS

International Search Report issued Sep. 24, 2020 in PCT/JP2020/030445, filed on Aug. 7, 2020, 3 pages.

*Primary Examiner* — Derek J Rosenau
(74) *Attorney, Agent, or Firm* — Maier & Maier, PLLC

(57) ABSTRACT

A tactile device includes: a substrate provided with a first surface; an organic piezoelectric film arranged on the first surface side; a plurality of electrodes arranged on the first surface; and a plurality of drive circuits arranged between the substrate and the organic piezoelectric film. The plurality of electrodes includes: a common electrode arranged across a plurality of cells; and a plurality of driving electrodes respectively arranged in the plurality of cells. The plurality of drive circuits includes: a first drive circuit capable of supplying a first driving signal; and a second drive circuit capable of supplying a second driving signal. The plurality of driving electrodes includes: a first driving electrode connected to the first drive circuit; and a second driving electrode connected to the second drive circuit. The first driving electrode and the second driving electrode are arranged in each of the plurality of cells.

18 Claims, 14 Drawing Sheets

(51) Int. Cl.
  *G06F 3/044* (2006.01)
  *H10N 30/20* (2023.01)
  *H10N 30/87* (2023.01)

(58) Field of Classification Search
  USPC .......................................... 310/322, 328, 334
  See application file for complete search history.

(56) References Cited

FOREIGN PATENT DOCUMENTS

| | | | |
|---|---|---|---|
| JP | 2019-506116 A | 2/2019 |
| WO | WO 2011/125408 A1 | 10/2011 |
| WO | WO 2013/080874 A1 | 6/2013 |

\* cited by examiner

TACTILE DEVICE

CROSS-REFERENCE TO RELATED APPLICATION

The present application is a continuation of International Application No. PCT/JP2020/030445 filed on Aug. 7, 2020, and claims priority to Japanese Patent Application No. 2019-171760 filed on Sep. 20, 2019, the disclosure of which is incorporated herein by reference.

TECHNICAL FIELD OF THE INVENTION

The present invention relates to a technique of a tactile device.

BACKGROUND OF THE INVENTION

Patent Document 1 (Japanese Patent Application Publication No. 2014-170266) describes a tactile device that perceives a tactile sensation by generating stimulating ultrasonic waves from a plurality of ultrasonic elements arranged in an array.

SUMMARY OF THE INVENTION

There is a technique for transmitting information to a user by stimulating tactile receptors of the user. As a tactile device using this tactile transmitting technique, there is a tactile device that vibrates a vibrating element d stimulates tactile receptors of a user by this vibration, for example. The inventor of the present application has studied a technique for increasing an amount of information that can be identified by a user in a tactile device using vibration.

It is an object of the present invention to provide a technique for improving performance of a tactile device.

A tactile device according to one aspect of the present invention includes: a substrate provided with a first surface; an organic piezoelectric film arranged on the first surface side of the substrate, the organic piezoelectric film having a piezoelectric property; a plurality of electrodes arranged on the first surface of the substrate; and a plurality of drive circuits arranged between the substrate and the organic piezoelectric film, each of the drive circuits being configured to apply a drive voltage to the organic piezoelectric film during a piezoelectric driving period for driving the organic piezoelectric film. In a plan view, the organic piezoelectric film is divided into a plurality of cells. The plurality of electrodes includes: a common electrode arranged across the plurality of cells in the plan view, a reference potential being supplied to the common electrode during the piezoelectric driving period; and a plurality of driving electrodes respectively arranged in the plurality of cells in the plan view. The plurality of drive circuits includes: a first drive circuit capable of supplying a first driving signal during the piezoelectric driving period; and a second drive circuit capable of supplying a second driving signal during the piezoelectric driving period, the second driving signal being different from the first driving signal. The plurality of driving electrodes includes: a first driving electrode connected to the first drive circuit; and a second driving electrode electrically separated from the first driving electrode and connected to the second drive circuit. The first driving electrode and the second driving electrode are arranged in each of the plurality of cells.

BRIEF DESCRIPTIONS OF THE DRAWINGS

DESCRIPTIONS OF EMBODIMENT

Figure 1:
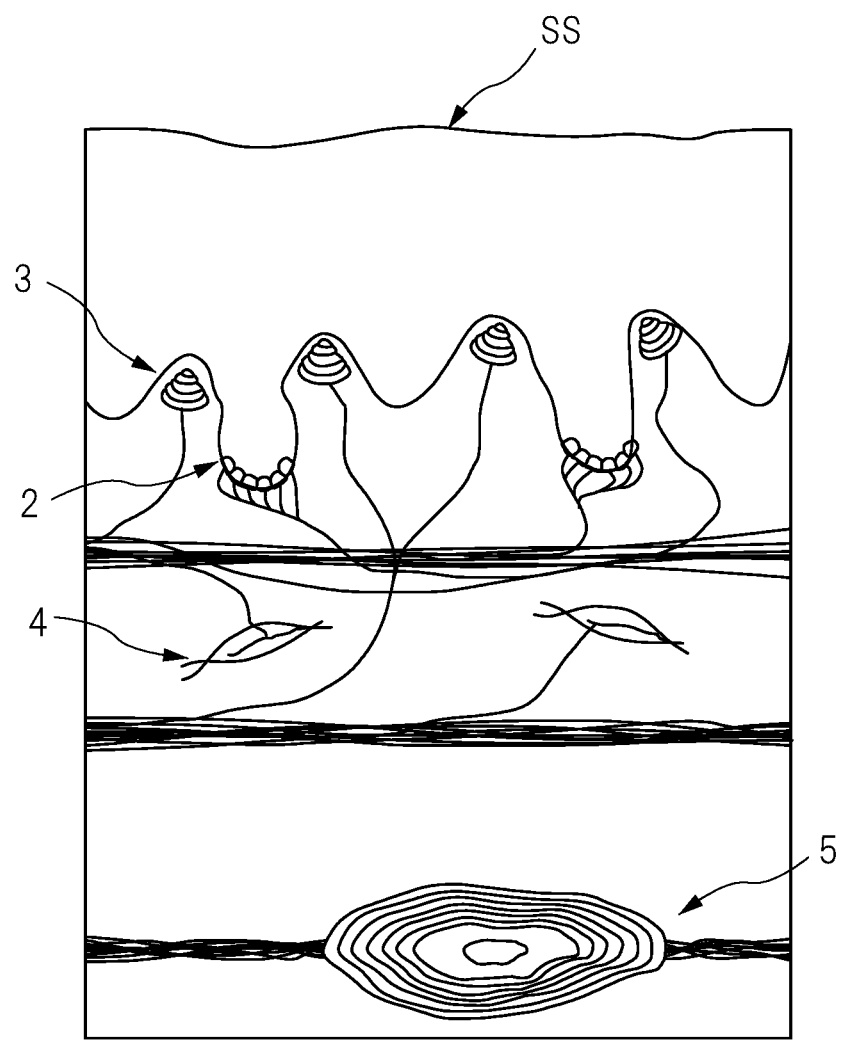
FIG. 1 is an enlarged sectional view schematically illustrating a layout of plural kinds of tactile receptors under a skin surface of a living organism.

Hereinafter, each embodiment of the present invention will be described with reference to the drawings. This disclosure is an example only and suitable modifications which can be easily conceived by a person having ordinary skill in the art without departing from the gist of the present invention are included within the scope of the present invention as a matter of course. In addition, in order to further clarify the description, a width, a thickness, a shape, and the like of respective portions may be schematically illustrated in the drawings compared with actual forms, but they are examples only and do not limit the interpretation of the present invention. In addition, in this specification and the respective drawings, the same components described in the drawings which have been described before are denoted by the same or related reference numerals, and detailed description thereof maybe omitted as needed.

A technique described below can be used in combination with a display device configured to display an image and video or a touch panel. However, a tactile device is a device that transmits information to a user by stimulating tactile receptors of the user by means of vibration. Therefore, it can be used independently without being combined with the display device or the touch panel. In an embodiment below, in order to make a configuration of the tactile device easy to understand, an embodiment that is not combined with functions of the display device or the touch panel will be described.

In the specification of the present application, a unit of an oscillator that generates vibration for stimulating tactile sensations of a user may be expressed as a "cell". In case of a tactile device of the present application, a plurality of driving electrodes is arranged in one cell. A unit corresponding to each of the plurality of driving electrodes may be referred to as a "sub cell". Vibration of one "cell" is configured by vibration of any one or more "sub cells" of a plurality of "sub cells" included in the one "cell". The tactile device is not a device that displays an image or video, but the user can convert a tactile sensation perceived based on vibration, which is provided from a plurality of cells, into information. In other words, the user can obtain information outputted from the tactile device by integrating the vibration of each of the plurality of cells in the tactile device. Further, in the following description, a unit expressed as a "cell" can be read as an "oscillator". Further, a unit expressed as a "sub cell" can be read as a "sub oscillator". The "oscillator" includes a plurality of "sub oscillators", and a degree of vibration by the "oscillator" is defined by turning ON or OFF of each of the plurality of "sub oscillators".

In the specification of the present application, the term "in a plan view" means a case where a substrate 10 illustrated in FIG. 3 (will be described later) is viewed from a front face 10$f$ side. Further, the term "in a plan view" is used as a term for specifying a planar positional relationship of various parts included in a finished product of the tactile device. For this reason, when the finished product of the tactile device is viewed from the front face 10$f$ side, in addition to visible members, the term "in a plan view" is used even in case of indicating a planar positional relationship of invisible parts (for example, cells PX illustrated in FIG. 2, driving electrodes 12 illustrated in FIG. 6, and the like).

<Tactile Receptor>

First, a mechanism in which living organisms such as humans or animals perceives a tactile sensation will be described. FIG. 1 is an enlarged sectional view schematically illustrating a layout of plural kinds of tactile receptors under a skin surface of a living organism. The living organisms such as humans or animals perceive mechanical deformation or vibration via receptors called mechanoreceptors. As illustrated in FIG. 1, as tactile receptors that transmit a tactile sensation of skin via nerves, there are Merkel's discs 2, Meissner's corpuscles 3, Ruffini's corpuscles 4, the Vater-Pacini corpuscles 5, and the like. The Meissner's corpuscles 3 are abundantly distributed in the vicinity of a boundary between epidermis and dermis (for example, the depth of about 0.7 to 2 mm from a skin surface SS). The Ruffini's corpuscles 4 are mainly distributed in the dermis. The Vater-Pacini corpuscles 5 are distributed at the deepest positions among the above four receptors, and are mainly distributed in a lower dermis layer or a subcutaneous tissue. In the example illustrated in FIG. 1, the Vater-Pacini corpuscles 5 exist at a depth of about 4 to 5 mm from the skin surface SS.

Each of the Merkel's discs 2, the Meissner's corpuscles 3, the Ruffini's corpuscles 4, and Vater-Pacini corpuscles 5 has a different response characteristic to a tactile sensation from each other. The Merkel's discs 2 have a slow rate of adaptation to force and tend to respond to continuous pressure. The Meissner's corpuscles 3 has a fast rate of adaptation to force and tend to respond to vibration or the like. The Ruffini's corpuscles 4 have a slow rate of adaptation to force and tend to respond to a mechanical change of the skin in contact with an object. The Vater-Pacini corpuscles 5 have the fastest rate of adaptation to force among the four receptors and tend to respond to a change in pressure, vibration, or the like.

The living organism perceives a tactile sensation via the various receptors as described above. For this reason, if vibration stimulation can be applied by focusing on any one or more receptor among plural kinds of receptors that have different characteristics from each other and are respectively distributed at different depths from each other, it is possible to increase the variation of the tactile sensation perceived by the user. If the variation of the tactile sensation obtained from the tactile device is increased, it is possible to increase the amount of information that can be identified by the user of the tactile device. Based on the above, the inventor of the present application has studied a technique for freely stimulating any of a plurality of receptors by controlling a generation source of the vibration stimulation.

It is possible to perceive a relatively weak force against the Merkel's discs 2 or the Meissner's corpuscles 3 positioned at a relatively shallow distance from the skin surface SS. On the other hand, in order for the Vater-Pacini corpuscles 5 existing at a position far from the skin surface SS to react the applied force, it is necessary to apply a strong force. Therefore, in order to freely stimulate any of the plurality of receptors, a mechanism capable of freely generating strong vibration and weak vibration is required.

<Configuration Outline of Tactile Device>

Figure 2:
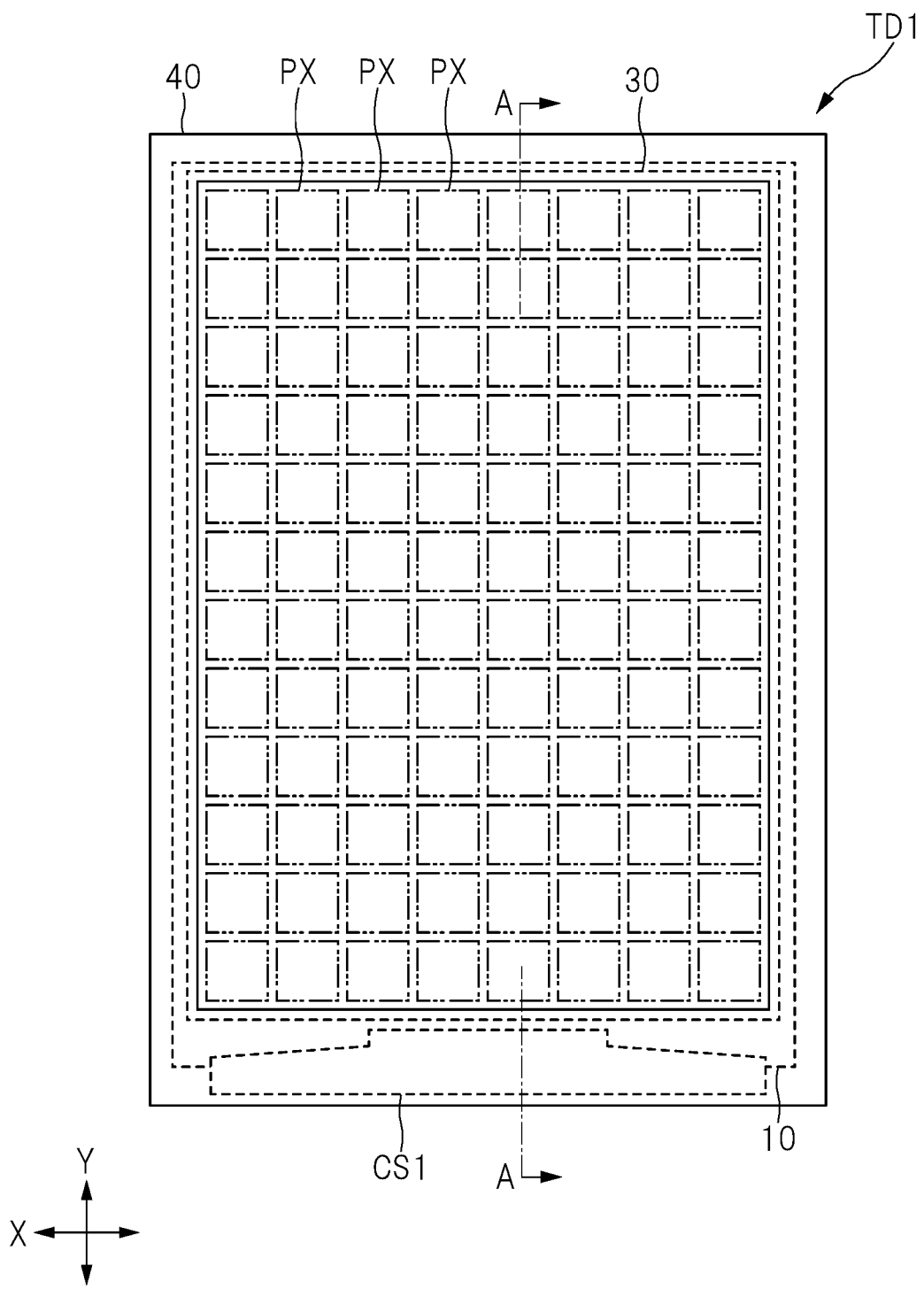
FIG. 2 is a plan view of on a display surface side illustrating one example of a tactile device according to one embodiment.

Next, an outline of a configuration of the tactile device will be described. FIG. 2 is a plan view of the tactile device according to the present embodiment. In order to illustrate a planar layout example of a plurality of cells PX, FIG. 2 schematically illustrates each of the plurality of cells PX by a two-dot chain line. However, as described above, each of the plurality of cells PX is one unit of an oscillator that generates vibration for stimulating a tactile sensation of the user, and it does not matter whether the plurality of cells PX can be viewed or not. FIG. 3 is a sectional view taken along an A-A line of FIG. 2.

Figure 3:
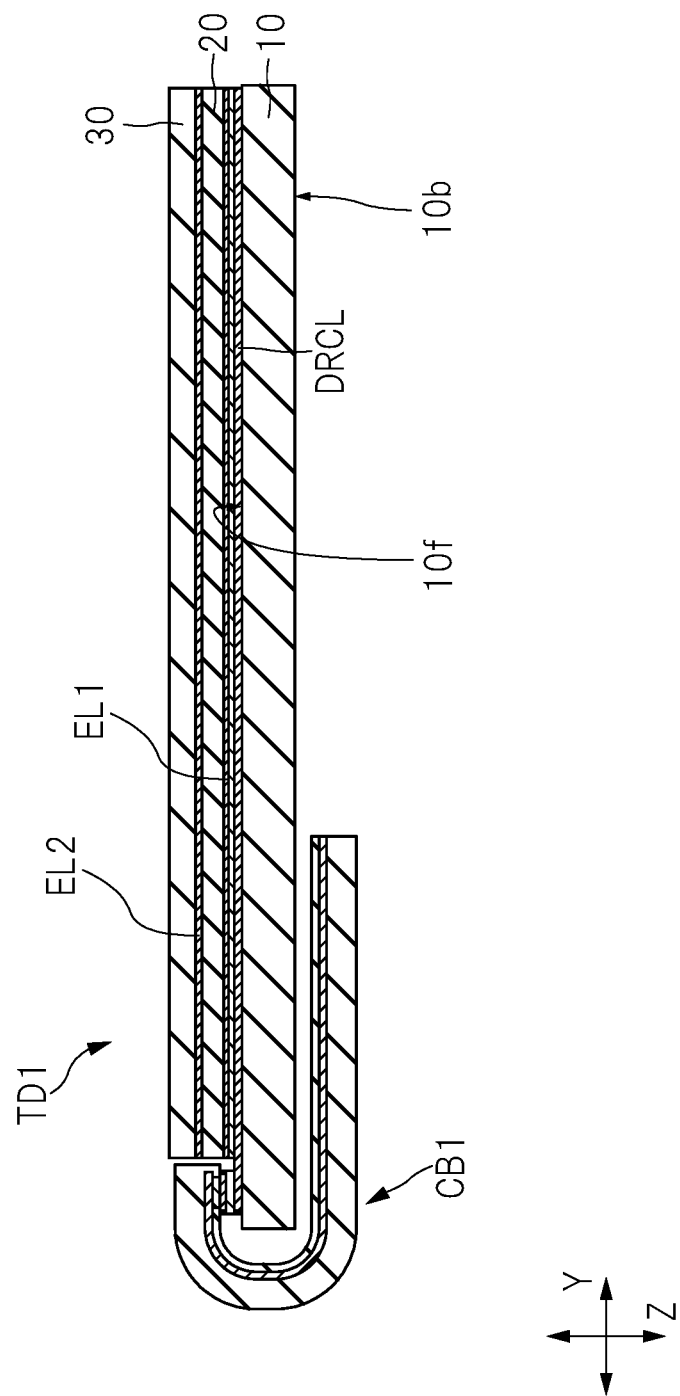
FIG. 3 is a sectional view taken along an A-A line of FIG. 2.

As illustrated in FIG. 3, a tactile device TD1 includes a substrate 10, an organic piezoelectric film 20, electrode layers EL1 and EL2 in which a plurality of electrodes is arranged, and a drive circuit layer DRCL in which a drive circuit capable of applying a drive voltage to the organic piezoelectric film 20 is formed. Further, in the example illustrated in FIG. 3, the tactile device TD1 includes a cover member 30 that covers the organic piezoelectric film 20. The tactile device TD1 includes a chassis 40 (see FIG. 2) that houses each of the members described above. Illustration of the chassis 40 is omitted in FIG. 3. The cover member 30 is exposed from the chassis 40 at an opening of the chassis 40.

As illustrated in FIG. 3, the tactile device TD1 includes the substrate 10, the organic piezoelectric film 20, the electrode layers EL1 and EL2 in which the plurality of electrodes is arranged, and the drive circuit layer DRCL in which the drive circuit capable of applying the drive voltage to the organic piezoelectric film 20 is formed. Further, in the example illustrated in FIG. 3, the tactile device TD1 includes the cover member 30 that covers the organic piezoelectric film 20. The tactile device TD1 includes the chassis 40 (see FIG. 2) that houses each of the members described above. Illustration of the chassis 40 is omitted in FIG. 3. The cover member 30 is exposed from the chassis 40 at the opening of the chassis 40.

The substrate 10 has the front face 10f, and a back face 10b on the opposite side of the front face 10f. The substrate 10 is a plate-like member for supporting each of the members included in the tactile device TD1. As the substrate 10, a material similar to that of a display device, such as glass or resin, can be used, for example. Further, in case of the tactile device TD1, the substrate 10 is not required to have visible light transparency. Therefore, it is possible to select a material that is opaque to visible light, and the degree of freedom in material selection is high as compared with a substrate for a display such as a liquid crystal display device.

The organic piezoelectric film 20 illustrated in FIG. 3 is arranged on the front face 10f side of the substrate 10, and covers the entire or most of the front face 10f. The organic piezoelectric film 20 has a piezoelectric property that a shape thereof is displaced when a voltage is apply thereto. An amount of displacement of the organic piezoelectric film 20 changes depending upon the magnitude of the applied voltage. When an AC voltage (including a pulse voltage) is applied to the organic piezoelectric film 20, the organic piezoelectric film 20 vibrates in accordance with a cycle of the applied voltage. As the organic piezoelectric film 20, it is possible to exemplify a polymer such as polyvinylidene fluoride (hereinafter, referred to as "PVDF"), for example. when a PVDF film is subjected to polling processing (for example, a process of applying a voltage under an environment of about 50° C.), the PVDF film is polarized in a voltage application direction. This makes it possible to obtain the organic piezoelectric film 20 having the piezoelectric property. Note that details of the polling processing will be described later.

Each of the electrode layers EL1 and EL2 is a conductive layer in which a plurality of electrodes for applying a voltage to drive the organic piezoelectric film 20 is arranged. In the present embodiment, the organic piezoelectric film 20 is arranged between the electrode layer EL1 and the electrode layer EL2. In other words, the electrode layer EL1 faces the electrode layer EL2 via the organic piezoelectric film 20. In a case where the electrode layer EL1 faces the electrode layer EL2 via the organic piezoelectric film 20 in this manner, it is possible to apply a voltage in a thickness direction of the organic piezoelectric film 20 by applying the voltage between the electrode layer EL1 and the electrode layer EL2. Although details thereof will be described later, in case of the tactile device TD1, the electrode layer EL1 is formed so that a plurality of driving electrodes 12 (see FIG. 7) is arranged in each of the plurality of cells PX (see FIG. 1). Further, a common electrode 11 (see FIG. 7) is formed in the electrode layer EL2 so as to be arranged across the plurality of cells PX.

The drive circuit layer DRCL includes transistors as switches for applying a drive potential to the driving electrodes formed in the electrode layer EL1, and a plurality of wirings for applying a potential to the driving electrodes via the transistors. In the present embodiment, thin film transistors (Thin Film Transistors), which are formed by depositing a semiconductor layer on the front face 10f side of the substrate 10, are used as the switches. Two transistors are connected to each of the plurality of driving electrodes formed in the electrode layer EL1. A configuration example of the drive circuit will be described later.

The electrode layer EL2 is covered with the cover member 30. The cover member 30 is a protective film for protecting the organic piezoelectric film 20 and the electrode layer EL2. The cover member 30 is formed of the same material as that of the substrate 10 or a material different from that of the substrate 10, for example. However, in a case where the cover member 30 is provided, the user perceives an operation of the organic piezoelectric film 20 via the cover member 30. Therefore, it is preferable that the cover member 30 does not easily interfere with the operation of the organic piezoelectric film 20 and transmission of vibration from the organic piezoelectric film 20.

Further, as illustrated in FIG. 3, the tactile device TD1 includes a wiring substrate CB1 connected to the substrate 10. The wiring substrate CB1 is connected to the plurality of transistors formed in the drive circuit layer DRCL, the plurality of driving electrodes formed in the electrode layer EL1, and the common electrode formed in the electrode layer EL2. A power supply circuit and a control circuit configured to control the drive of the organic piezoelectric film 20 are formed in the wiring substrate CB1, for example.

Although illustration thereof is omitted, as a modification example of the present embodiment, a technique that will be described below may be applied to the tactile device that does not include the cover member 30 and the chassis 40. Further, various circuits formed in the wiring substrate CB1 may be formed on the substrate 10. In this modification example, the wiring substrate CB1 may not be connected to the substrate 10.

<Details of Drive System>

Figure 4:
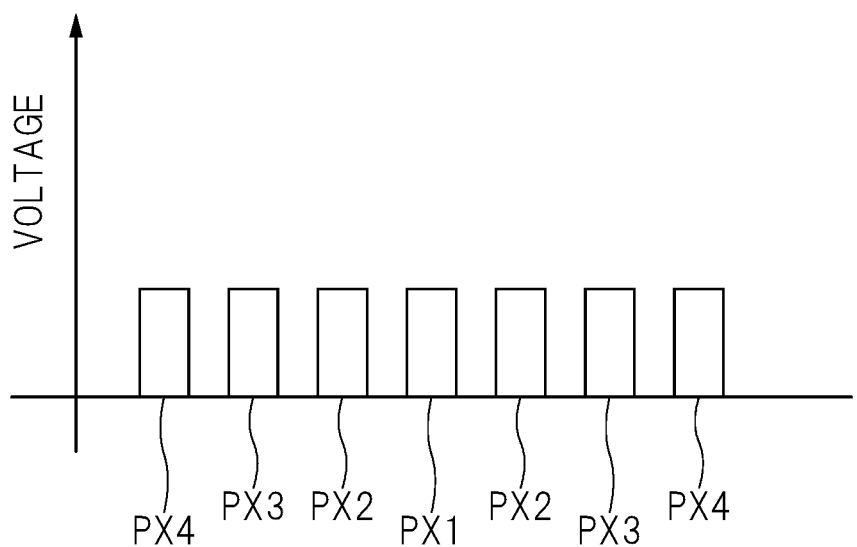
FIG. 4 is an explanatory diagram schematically illustrating a relationship between the magnitude of voltage applied to each of oscillators respectively arranged in a plurality of cells adjacent to each other and a distance from a vibration generation source to a focal point at which vibration is perceived.
Figure 4:
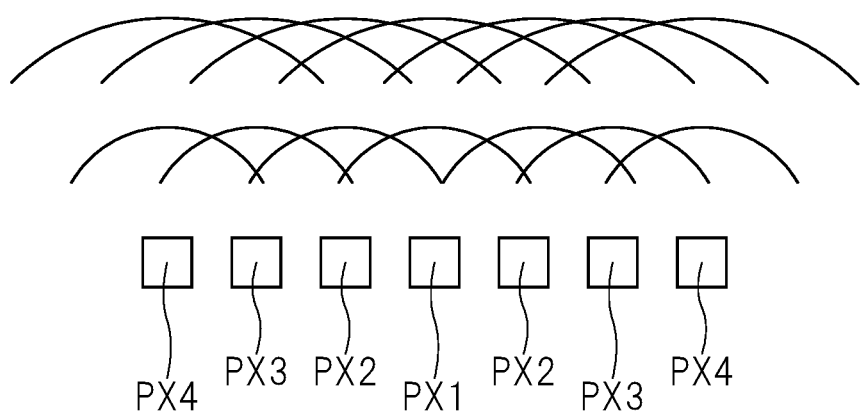
Figure 5:
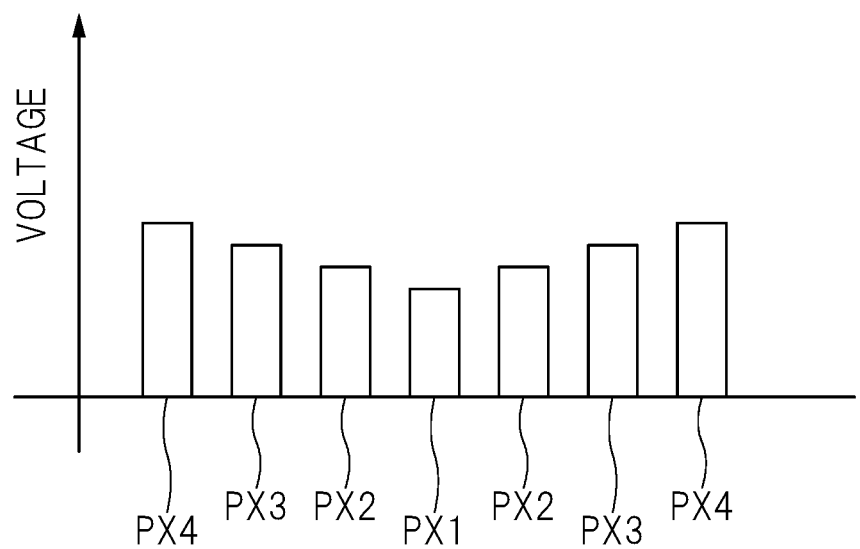
FIG. 5 is an explanatory diagram schematically illustrating a relationship between the magnitude of voltage applied to each of oscillators respectively arranged in a plurality of cells adjacent to each other and a distance from a vibration generation source to a focal point at which vibration is perceived in a different driving method from a driving method illustrated in FIG. 4.
Figure 5:
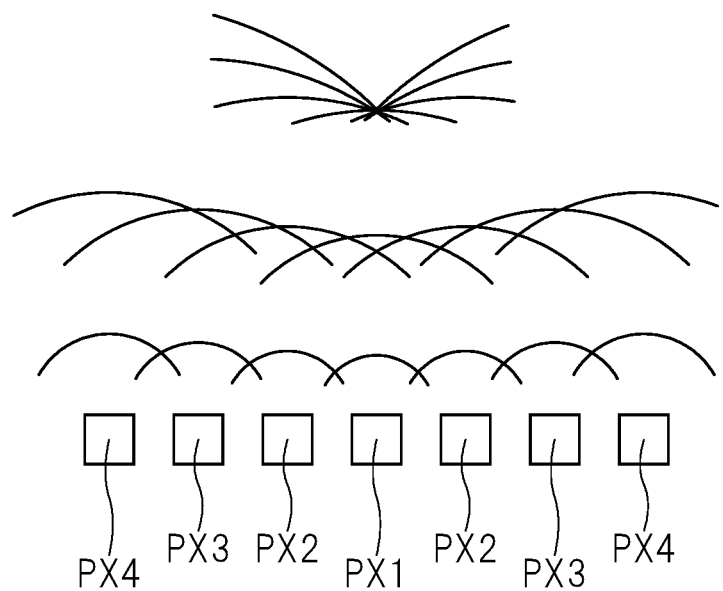

Next, details of a layout of the electrodes included in the tactile device TD1 illustrated in FIG. 2 and a driving method of the organic piezoelectric film 20 will be described. Each of FIG. 4 and FIG. 5 is an explanatory diagram schematically illustrating a relationship between the magnitude of a voltage applied to each of the oscillators arranged in the plurality of cells adjacent to each other and a distance from a vibration generation source to a focal point at which vibration is perceived. Views illustrated in upper stages of FIG. 4 and FIG. 5 illustrate the magnitude of the voltage applied to the plurality of oscillators adjacent to each other as a bar graph, and views illustrated in lower stages thereof schematically illustrate states of vibration propagation from each oscillator. Further, FIG. 4 illustrates an example of the driving method in a case where the distance from the vibration generation source to the focal point at which the vibration is perceived (hereinafter, referred to as a "focal point distance") is short. FIG. 5 illustrates an example of the driving method in a case where the focal point distance is long.

Figure 10:
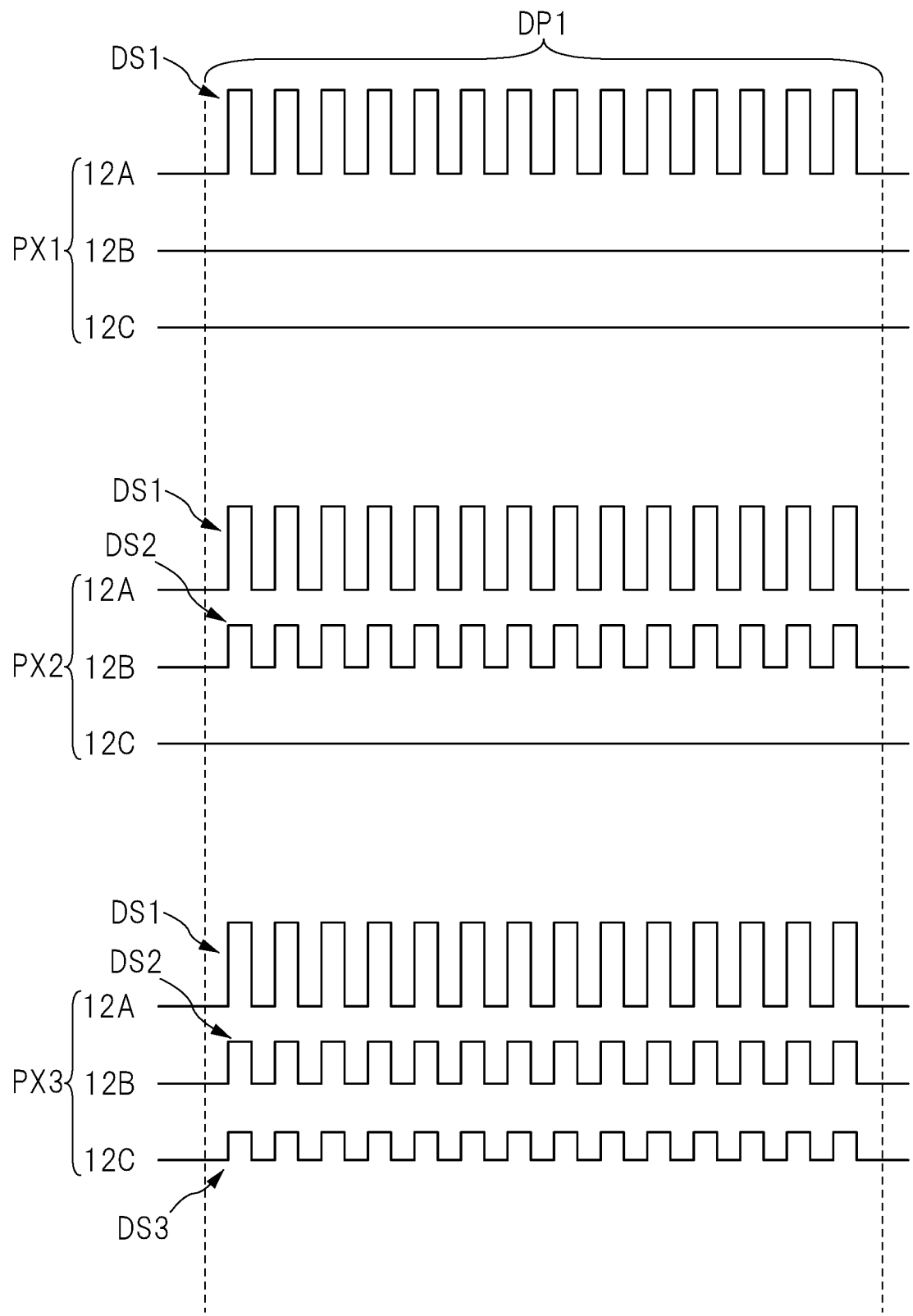
FIG. 10 is an explanatory diagram illustrating one example of a waveform of the driving signal applied to each cell in a drive system illustrated in FIG. 9.
Figure 12:
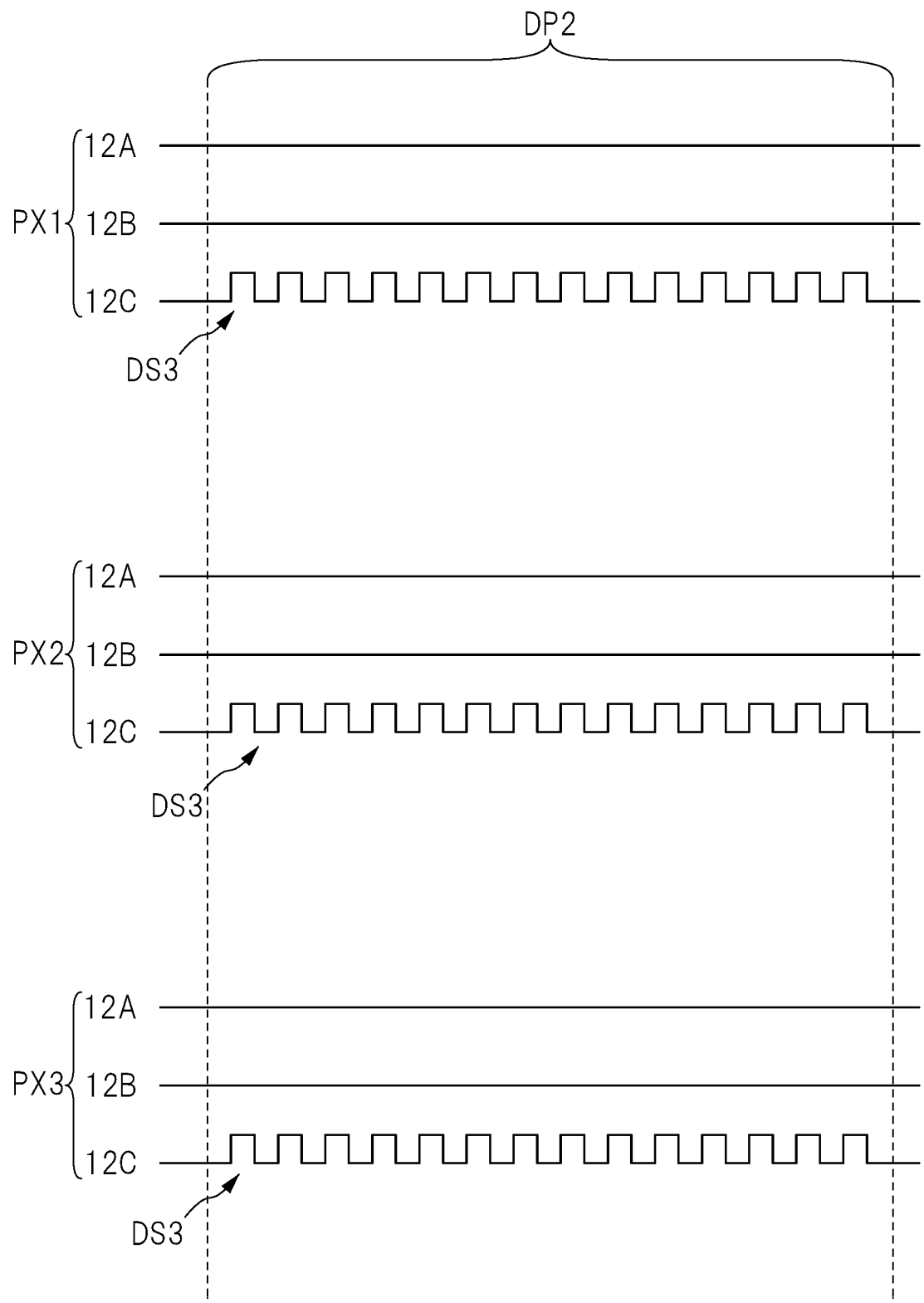
FIG. 12 is an explanatory diagram illustrating one example of a waveform of the driving signal applied to each cell in the drive system illustrated in FIG. 11.

Note that as illustrated in FIG. 10 and FIG. 12 (will be described later), a pulse voltage having a pulse waveform that repeats intermittently is applied to the plurality of cells PX. The bar graph in each of the upper stages of FIG. 4 and FIG. 5 illustrates the maximum value of the pulse voltage. Further, in a case where a cyclical pulse voltage is applied to the cells PX, a phase (or a delay time) of the pulse voltage affects the focal point distance. Hereinafter, for ease of understanding, a case where a pulse voltage having the same frequency is applied to each of the plurality of cells PX in the same phase (or the same delay time) will be described. In the following description, in a case where it is not particularly stated that the phase or the delay time of the pulse voltage is different, the description is based on the premise that the pulse voltage of the same frequency is applied in the same phase (or the same delay time). The pulse voltage described above is applied to the driving electrodes arranged in each of the cells PX. Since the pulse voltage applied to the driving electrode corresponds to a driving signal for driving the organic piezoelectric film 20 illustrated in FIG. 3, hereinafter, the pulse voltage applied to the driving electrode will be referred to as a "driving signal".

The tactile device TD1 according to the present embodiment is configured so that each of the cells PX illustrated in FIG. 2 can be driven independently. Each of the plurality of cells PX corresponds to an oscillator configured to generate vibration having the same vibration energy as each other, or vibration having a different vibration energy from each other. As illustrated in FIG. 4, in a case where the driving signal having the same voltage is applied to each of the plurality of oscillators (cells PX1 to PX4 illustrated in FIG. 4) arranged adjacent to each other at the same timing, the driving signal is propagated in a vertical direction from a surface on which the plurality of oscillators (the cells PX) is arranged. In this case, it is possible to propagate the vibration almost evenly over a wide area. In case of the drive system illustrated in FIG. 4, the focal point distance is short, and a range of the focal point is wide. The vibration propagated by such a drive system is suitable as a method of propagating the vibration perceived by the Merkel's discs 2 and the Meissner's corpuscles 3 illustrated in FIG. 1.

In the example of the driving method illustrated in FIG. 5, the driving signal having the different voltage from each other is applied to each of the plurality of oscillators arranged adjacent to each other. For details, among the plurality of oscillators illustrated in FIG. 5, the maximum value of the driving signal applied to the oscillator arranged in the cell PX1 is the smallest, and the maximum value of the driving signal applied to the oscillators respectively arranged in the plurality of cells PX2 adjacent to the cell PX1 is the next smallest. Hereinafter, in the order of the plurality of cells PX3 respectively adjacent to the outsides of the cells PX2 and the plurality of cells PX4 adjacent to the outsides of the cells PX3, the maximum value of the driving signal applied to the oscillators becomes larger as the distance from the cell PX1 increases. In case of such a drive system, the vibration itself of each oscillator is propagated in the vertical direction from the surface on which the plurality of oscillators is arranged. However, since the maximum value of the driving signal applied to each of the adjacent oscillators is different from each other, there is a position where the propagated vibration (ultrasonic wave vibration) is amplified. For this reason, in case of the drive system illustrated in FIG. 5, it is possible to lengthen the focal point distance by adjusting a ratio of the maximum values of the driving signals respectively applied to the oscillators. Further, a range of the focal point is narrow as the example illustrated in FIG. 4. Therefore, the vibration propagated by the drive system illustrated in FIG. 5 is suitable as a method of propagating the vibration perceived by the Vater-Pacini corpuscles 5 illustrated in FIG. 1.

Further, when the vibration is propagated in the user's body illustrated in FIG. 1, the longer the propagation distance is, the weaker the intensity of the vibration is. Therefore, by taking into consideration damping of the vibration, it is preferable that the intensity of the vibration generated at an initial stage is stronger in a case where the focal point distance is long as compared with a case where the focal point distance is short. Hereinafter, a detailed structure of the oscillators included in the tactile device TD1 according to the present embodiment and a driving method of generating vibration at various focal point distances will be described.

Figure 6:
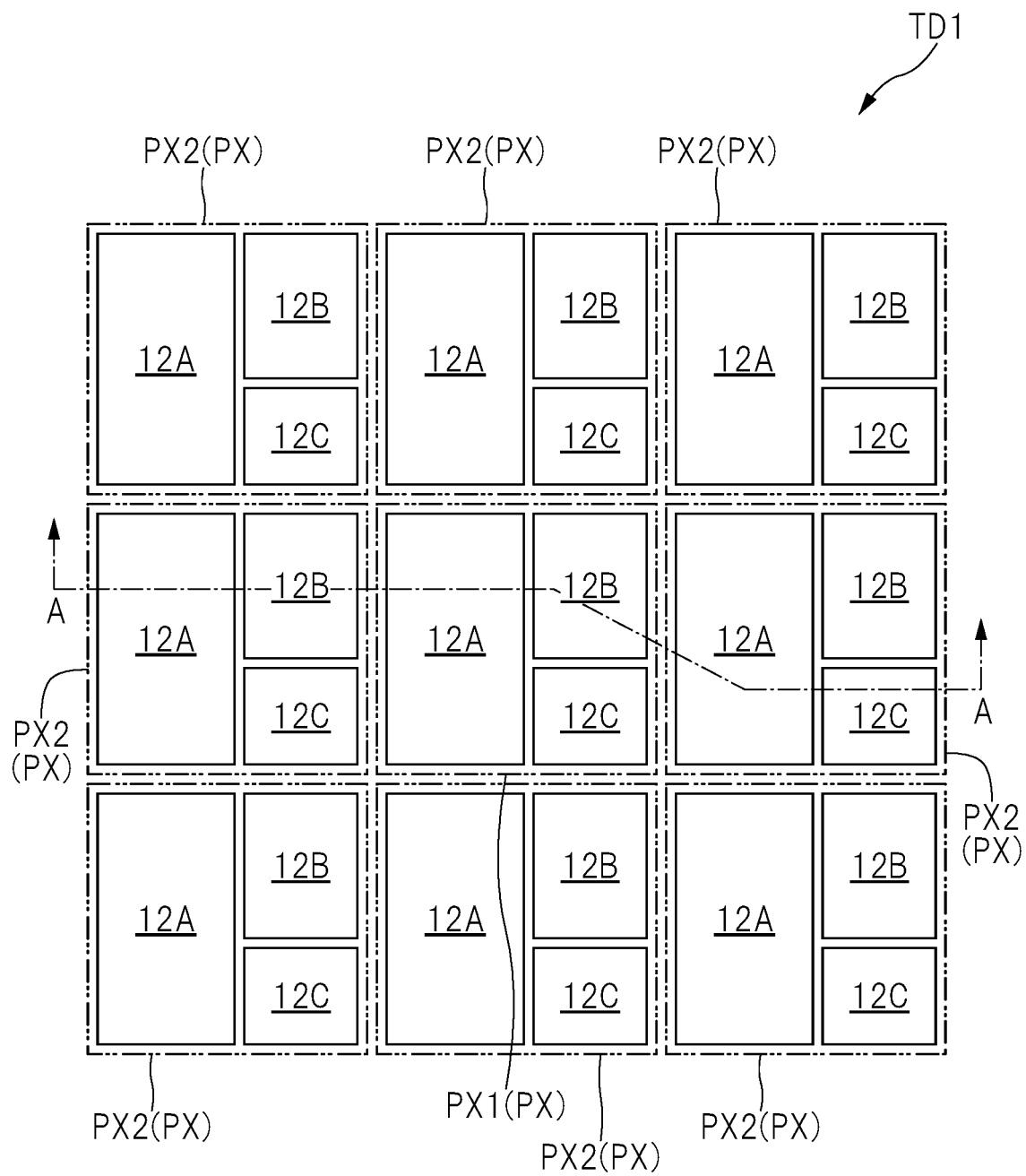
FIG. 6 is an enlarged plan view illustrating a part of the plurality of cells illustrated in FIG. 2.
Figure 7:
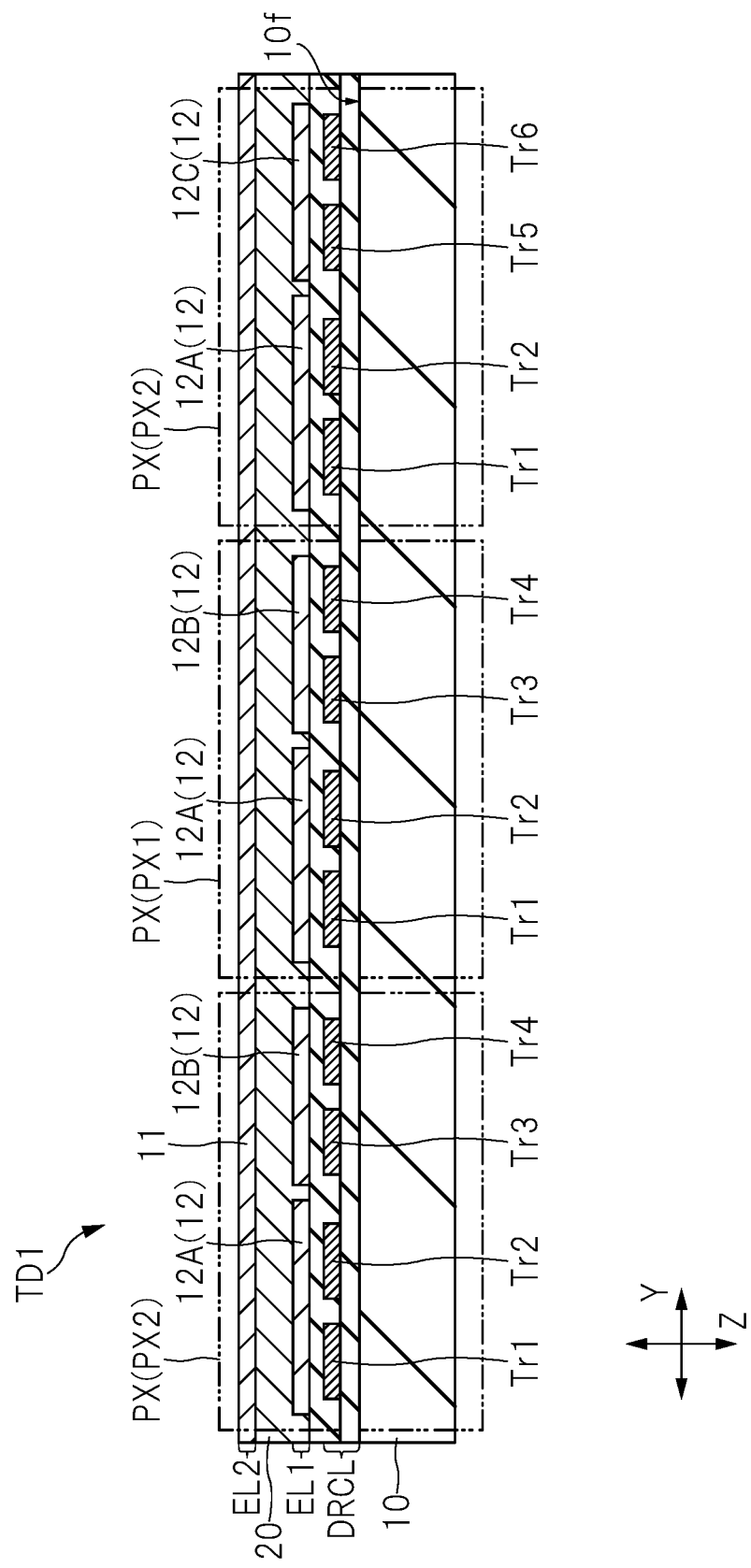
FIG. 7 is an enlarged sectional view taken along an A-A line of FIG. 6.
Figure 8:
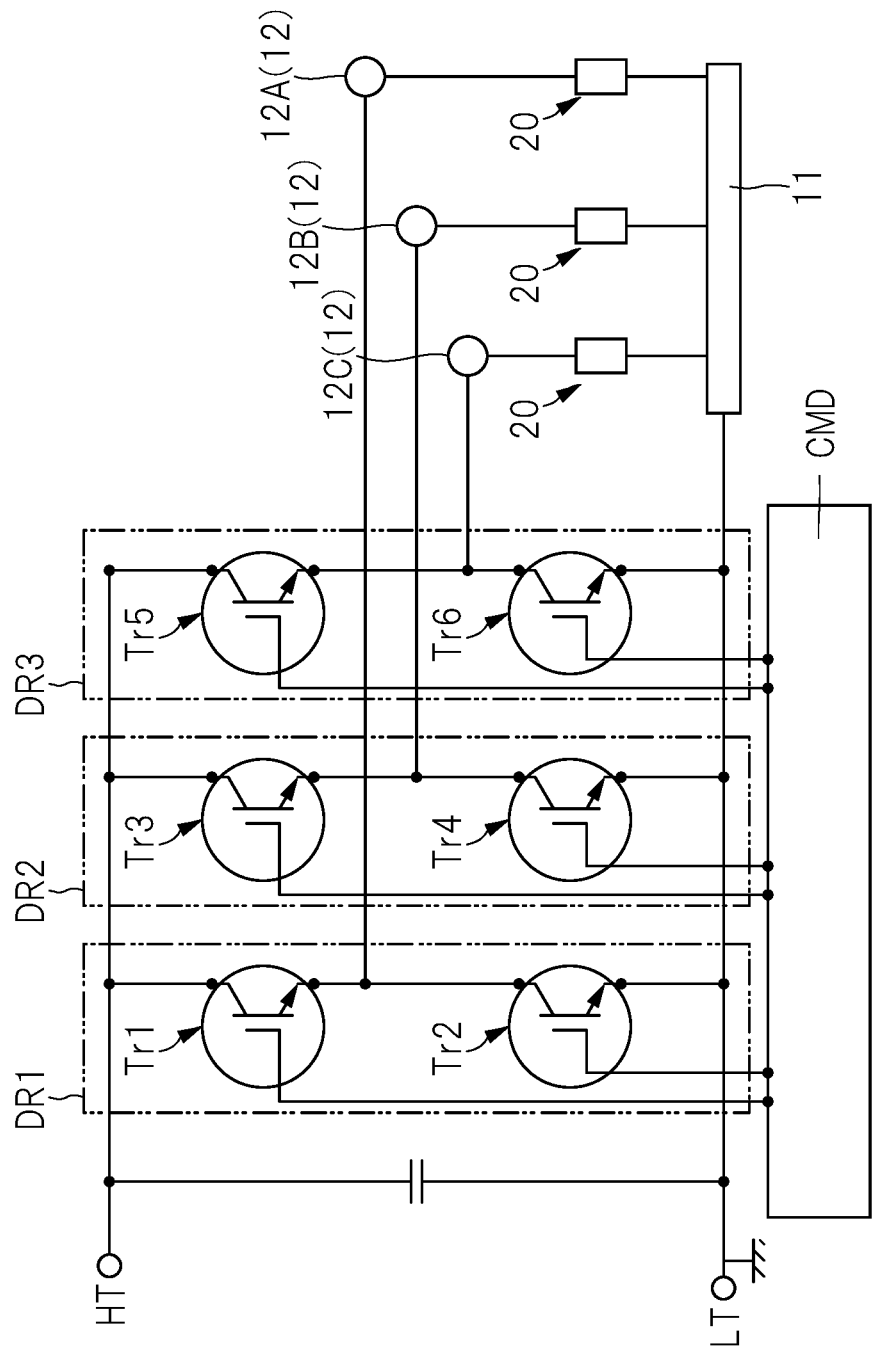
FIG. 8 is a circuit block diagram illustrating a configuration example of a drive circuit that drives one of the plurality of cells illustrated in FIG. 6.

FIG. 6 is an enlarged plan view illustrating a part of the plurality of cells illustrated in FIG. 2 in an enlarged manner. FIG. 7 is an enlarged sectional view taken along an A-A line of FIG. 6. FIG. 8 is a circuit block diagram illustrating a configuration example of a drive circuit configured to drive one of the plurality of cells illustrated in FIG. 6.

The front face 10f of the substrate 10 illustrated in FIG. 3 is divided into the plurality of cells PX (see FIG. 2) in a plan view, and the organic piezoelectric film 20 is arranged across the plurality of cells PX. In other words, the organic piezoelectric film 20 is divided into the plurality of cells PX corresponding to the plurality of oscillators. The plurality of electrodes included in the tactile device TD1 includes the common electrode 11, and the plurality of driving electrodes 12. The common electrode 11 is arranged across the plurality of cells PX in the plan view, and a reference potential is applied thereto during a piezoelectric driving period (will be described later). Each of the plurality of driving electrodes 12 is arranged at a position overlapping with the corresponding one of the plurality of cells PX in the plan view.

The common electrode 11 and the plurality of driving electrodes 12 face each other via the organic piezoelectric film 20. In other words, the organic piezoelectric film 20 is sandwiched between the common electrode 11 and the driving electrodes 12. In case of this structure, a voltage is applied in a thickness direction of the organic piezoelectric film 20. Further, as illustrated in FIG. 6, each of the plurality of cells PX in the tactile device TD1 includes the plurality of driving electrodes 12. For example, in the example illustrated in FIG. 6, driving electrodes 12A, 12B, and 12C are arranged in each of the cells PX1 and PX2. The driving electrodes 12A, 12B, and 12C are separated from each other. In other words, each of the plurality of driving electrodes 12 includes the driving electrode 12A, the driving electrode 12B electrically separated from the driving electrode 12A and arranged at a position overlapping with the same cell as the driving electrodes 12A, and the driving electrode 12C electrically separated from the driving electrodes 12A and 12B and arranged at a position overlapping with the same cell as the driving electrodes 12A and 12B. In the structure in which the plurality of driving electrodes 12 is arranged in one cell PX in this manner, it is possible to finely set the voltage applied to each of the plurality of cells PX.

As illustrated in FIG. 8, among the plurality of driving electrodes 12, each of the driving electrodes 12A is connected to a drive circuit DR1. Each of the driving electrodes 12B is connected to a drive circuit DR2. Each of the driving electrodes 12C is connected to a drive circuit DR3. Each of the drive circuits DR1, DR2, and DR3 is a power conversion circuit that converts DC power into pulse power by using transistors each of which is a switching element. Each of the drive circuits DR1, DR2, and DR3 includes two transistors. The drive circuit DR1 includes transistors Tr1 and Tr2. The drive circuit DR2 includes transistors Tr3 and Tr4. The drive circuit DR3 includes transistor Tr5 and Tr6.

As illustrated in FIG. 7, in the drive circuit layer DRCL, the transistors Tr1 and Tr2 are arranged at positions overlapping with the driving electrodes 12A. In the drive circuit layer DRCL, the transistors Tr3 and Tr4 are arranged at positions overlapping with the driving electrodes 12B. Further, since they are positioned in a cross section different from that of FIG. 7, they are not illustrated. The transistors Tr5 and Tr6 (see FIG. 8) connected to the driving electrodes 12C are arranged at positions overlapping with the driving electrodes 12C illustrated in FIG. 6. Although FIG. 7 illustrates the positions of the transistors Tr1, Tr2, Tr3, Tr4, Tr5, and Tr6 as a simplified manner, each of the transistors Tr1, Tr2, Tr3, Tr4, Tr5, and Tr6 is a thin film transistor formed on the front face 10f side of the substrate 10. The thin film transistor is formed by laminating a semiconductor layer and a conductor layer on the front face 10f side of the substrate 10. The semiconductor layer includes a source region and a drain region of the semiconductor layer, and a channel region positioned between the source region and the drain region. The conductor layer includes a gate arranged via a gate insulator film at a position overlapping with the channel region. In the example illustrated in FIG. 8, as one example of the thin film transistor, an example of using an n channel type transistor is illustrated. However, the conductive type of the transistor is not limited to the n type, and may be a p type. In a case where the p type transistor is used, the positions of the source and the drain of the transistor are opposite to each other with respect to the gate illustrated in FIG. 8.

Each of the drive circuits DR1, DR2, and DR3 illustrated in FIG. 8 includes a circuit structure in which a high-side switch connected to a relatively high potential and a low-side switch connected to a relatively low potential are connected to each other in series. In the example illustrated in FIG. 8, each of the transistors Tr1, Tr3, and Tr5 corresponds to the high-side switch, and each of the transistors Tr2, Tr4, and Tr6 corresponds to the low-side switch. The high-side switch and the low-side switch operate as a pair to be turned ON or OFF. When one switch of the pair of the high-side switch and the low-side switch is in an ON state, the other switch becomes an OFF state. When the pair of the high-side switch and the low-side switch executes an ON/OFF operation (hereinafter, referred to as a "switching operation"), the pulse power is outputted from each of the drive circuits DR1, DR2, and DR3. The ON/OFF operation of each of the transistors Tr1, Tr2, Tr3, Tr4, Tr5, and Tr6 is controlled by a gate signal that is inputted into the gate of each transistor from a control circuit CMD.

The source of each of the transistors Tr1, Tr3, and Tr5, which are the high-side switches, is connected to a high-side terminal HT to which a potential higher than that of a low-side terminal LT is applied. A potential of 100 V (volt) is applied to the high-side terminal HT, for example. On the other hand, the drain of each of the transistors Tr2, Tr4, and Tr6, which are the low-side switches, is connected to the low-side terminal LT to which a potential lower than that of the high-side terminal HT is applied. The low-side terminal LT is grounded, and for example, a ground potential (ground potential) is applied thereto.

Each of the driving electrodes 12A, 12B, and 12C is connected between the high-side switch and the low-side switch, which are connected to each other in series, and the common electrode 11 is connected to the low-side terminal LT. When the high-side switch is turned ON and the low-side switch is turned OFF, a potential between the high-side switch and the low-side switch becomes an intermediate potential of the potential of the high-side terminal HT (for example, 100 V) and the potential of the low-side terminal LT (for example, 0 V). The potential applied to the driving electrodes 12 is defined in accordance with a resistance value between the source and the drain of the high-side switch. For example, in the example of the present embodiment, when the high-side switch is turned ON, 90 V is applied to the driving electrodes 12A, 50 V is applied to the driving electrodes 12B, and 33 V is applied to the driving electrodes 12C. As will be described later, a driving signal having a pulse potential is applied to each of the driving electrodes 12A, 12B, and 12C. The voltages of 90 V, 50 V, and 33 V described above correspond to the maximum voltages (or amplitudes) of the respective driving signals.

On the other hand, when the low-side switch is turned ON and the high-side switch is turned OFF, the charge remaining between the high-side switch and the low-side switch is extracted, but almost no current flows between the driving electrodes 12 and the common electrode 11. For this reason, no voltage is applied between the driving electrodes 12 and the common electrode 11.

As described above, a predetermined potential (for example, 90 V, 50 V, or 33 V) is applied to the driving electrodes 12 when the high-side switch is turned ON, and any voltage is not applied between the driving electrodes 12 and the common electrode 11 when the high-side switch is turned OFF. Therefore, by causing the high-side switch and the low-side switch to repeatedly execute the ON/OFF operation, it is possible to apply the driving signal to the organic piezoelectric film 20 between the driving electrodes 12 and the common electrode 11. The organic piezoelectric film 20 is a functional film having a piezoelectric effect in which a shape thereof changes with a change in the applied voltage. For example, when a voltage is applied to the organic piezoelectric film 20, the organic piezoelectric film 20 contracts in a direction in which the voltage is applied. When the voltage is turned OFF from a voltage applying state, it expands to return to its original shape. Therefore, when the driving signal is applied to the organic piezoelectric film 20, the organic piezoelectric film 20 generates vibration so as to imitate a waveform of the driving signal.

Further, the degree of deformation of the organic piezoelectric film 20 and the intensity of the vibration are proportional to the applied voltage. Namely, in a case where the amplitude of the driving signal is large, the organic piezoelectric film 20 is deformed greatly to generate strong vibration. In a case where the amplitude of the driving signal is small, the deformation of the organic piezoelectric film 20 is small to generate relatively weak vibration. Therefore, by increasing variations of a voltage value applied to the organic piezoelectric film 20 like the present embodiment, it is possible to increase variations of the intensity of vibration to be generated. Further, in the present embodiment, a phase of the driving signal applied to each of the plurality of cells PX illustrated in FIG. 6 is the same phase. However, as a modification example, it is possible to apply a driving signal having a different phase from each other to each cell.

Figure 9:
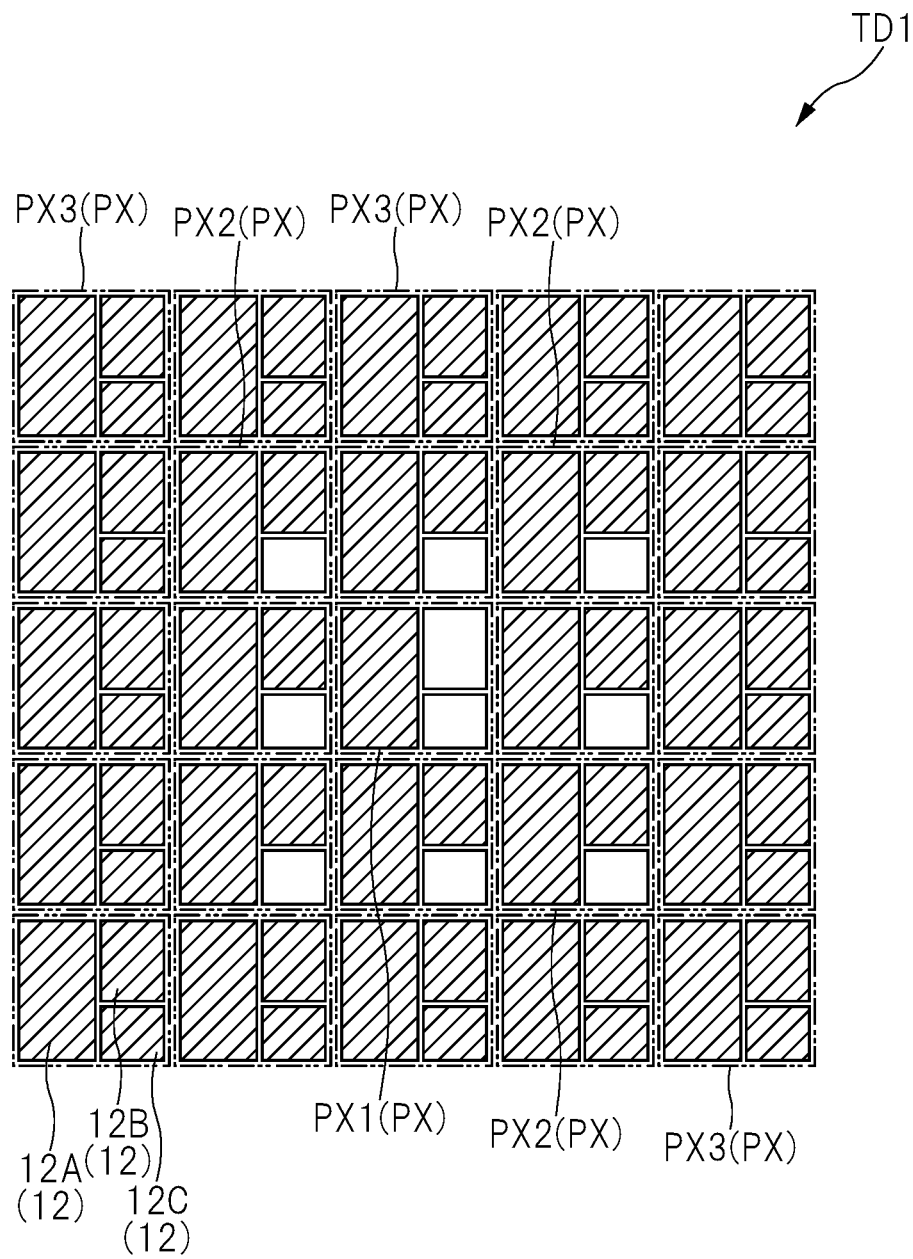
FIG. 9 is an enlarged plan view illustrating one example of driving electrodes to which a driving signal is supplied in the plurality of cells included in the tactile device.
Figure 11:
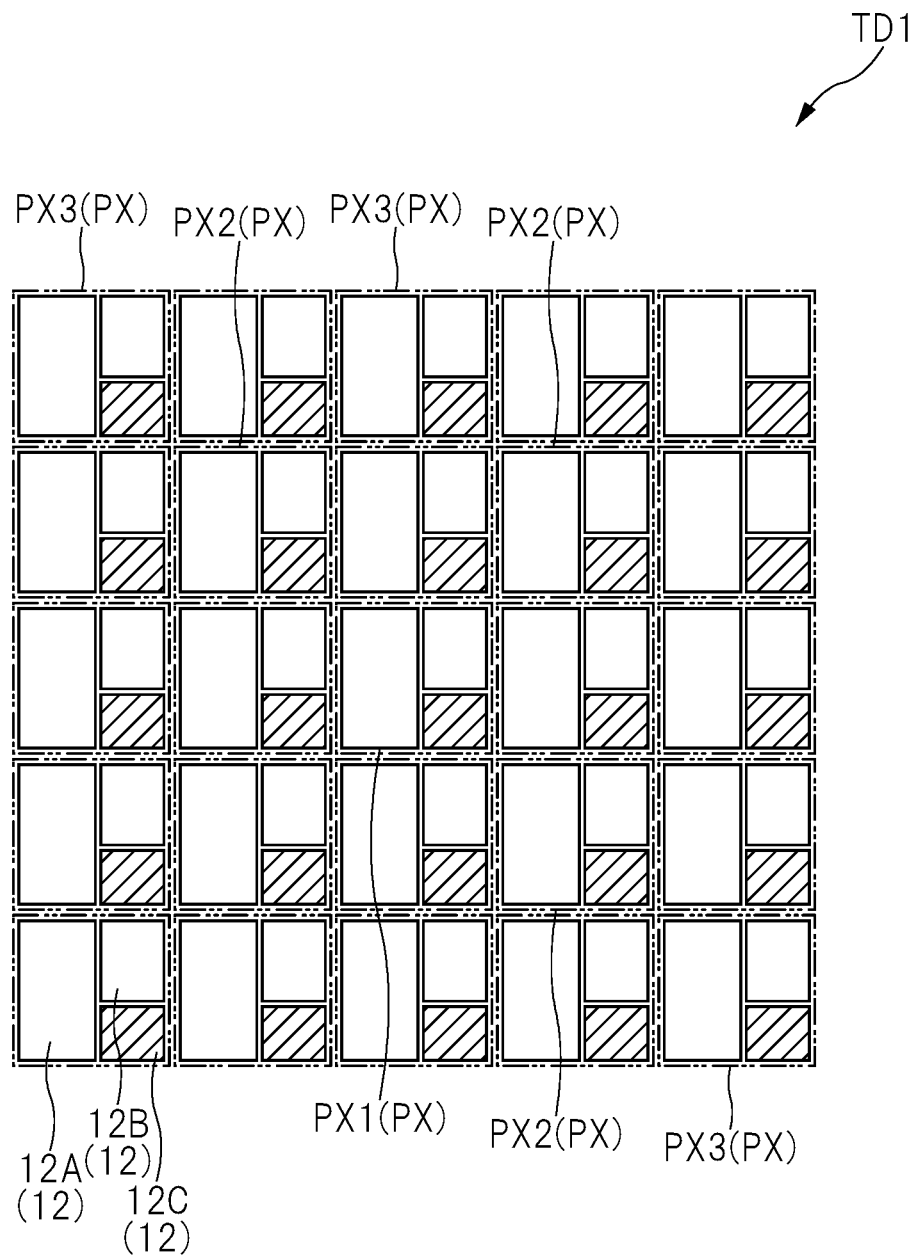
FIG. 11 is an enlarged plan view illustrating the other example than FIG. 9 of driving electrode to which a driving signal is supplied in the plurality of cells included in the tactile device.

Next, each of one example of a drive system that aims at tactile receptors positioned at a short focal point distance and one example of a drive system that aims at tactile receptors positioned at a long focal point distance will be described with reference to FIG. 9 to FIG. 12. FIG. 9 is an enlarged plan view illustrating one example of driving electrodes to each of which a driving signal is supplied in a plurality of cells included in a tactile device. FIG. 10 is an explanatory diagram illustrating one example of a waveform of the driving signal applied to each cell in the drive system illustrated in FIG. 9. FIG. 11 is an enlarged plan view illustrating another example other than that in FIG. 9 of driving electrodes to each of which a driving signal is supplied in the plurality of cells included in the tactile device. FIG. 12 is an explanatory diagram illustrating one example of a waveform of the driving signal applied to each cell in the drive system illustrated in FIG. 11. A driving method illustrated in FIG. 9 and FIG. 10 is one example of the drive system that aims at the tactile receptors positioned at the long focal point distance, and a driving method illustrated in FIG. 11 and FIG. 12 is one example of the drive system that aims at the tactile receptors positioned at the short focal point distance. FIG. 9 and FIG. 11 are the enlarged plan views of the electrode layer EL1 illustrated in FIG. 7, but in order to make it easier to identify the driving electrodes 12 to each of which the driving signal is applied, the driving electrodes 12 to each of which the driving signal is applied are hatched.

In the drive system that generates vibration for the long focal point distance illustrated in FIG. 9 and FIG. 10, driving signals having different voltages from each other are respectively applied to a plurality of cells PX. In the example illustrated in FIG. 9, the plurality of cells (oscillators) PX includes a cell (first oscillator) PX1, cells (second oscillators) PX3, and cells (third oscillators) PX2 positioned between the cell PX1 and the cells PX3. A driving signal is applied during a piezoelectric driving period DP1 (see FIG. 10) of a plurality of piezoelectric driving periods in which the organic piezoelectric film 20 (see FIG. 7) is driven as follows. Namely, a driving signal DS1 is applied to driving electrode(s) 12A of each of the cells PX1, PX2, and PX3. A driving signal DS2 having a potential lower than that of the driving signal DS1 is applied to driving electrodes 12B of each of the cells PX2 and PX3. A driving signal DS3 having a potential lower than that of the driving signal DS1 is applied to driving electrodes 12C of the cells PX3. The driving signal DS2 is not applied to driving electrode 12B of the cell PX1. The driving signal DS3 is not applied to driving electrode(s) 12C of each of the cells PX1 and PX2.

In case of the driving method illustrated in FIG. 9 and FIG. 10, it is possible to control the intensity of the vibration generated in each of the plurality of cells PX as well as the drive system that has been described with reference to FIG. 5. For details, no driving signal is applied to the driving electrodes 12B and 12C of the cell PX1 among the plurality of cells PX illustrated in FIG. 9. For this reason, vibration generated in the cell PX1 is weaker (or smaller) than vibration generated in the surrounding cells PX2 and PX3. Further, the vibration generated in each of the plurality of cells PX2 adjacent to the cell PX1 is stronger (or larger) than the vibration generated in the corresponding cell PX1, and is weaker (or smaller) than the vibration generated in the cells PX3. Further, the vibration generated in each of the plurality of cells PX3 adjacent to and outside the cell PX2 is stronger (or larger) than the vibration generated in each of the cell PX1 and the cell PX2. In a case where it is controlled so that the generated vibration is stronger (or larger) as a distance from the cell PX1 increases in this manner, it is possible to form focal points where the propagated vibration (ultrasonic wave vibration) is amplified at positions away from a vibration generation source.

Further, in the driving method illustrated in FIG. 9 and FIG. 10, the organic piezoelectric film 20 (see FIG. 7) is driven by the driving electrode 12A, to which the driving signal DS1 (see FIG. 10) having the largest maximum voltage (amplitude) is applied, of the three driving electrodes 12A, 12B, and 12C arranged in the cell PX1. In this case, the vibration generated in the cell PX1 is relatively weaker than the vibrations generated in the surrounding cells PX, but vibration stronger than that in a case where no pulse voltage is applied to the driving electrode 12A can be obtained. Therefore, since the vibration generated in the cells PX1, PX2 and PX3 is strong as a whole, it is possible to propagate vibration stimulation to receptors such as the Vater-Pacini corpuscles 5 positioned far from the skin surface SS illustrated in FIG. 1 even though the vibration is attenuated during the propagation.

In the drive system that generates vibration for the short focal point distance illustrated in FIG. 11 and FIG. 12, driving signals each having the same voltage as each other are respectively applied to a plurality of cells PX. In the example illustrated in FIG. 11, a plurality of cells (oscillators) PX includes a cell (first oscillator) PX1, cells (second oscillators) PX3, and cells (third oscillators) PX2 positioned between the cell PX1 and the cells PX3. A driving signal is applied during a piezoelectric driving period DP2 (see FIG. 12) of a plurality of piezoelectric driving periods in which the organic piezoelectric film 20 (see FIG. 7) is driven as follows. Namely, the driving signal DS1 (see FIG. 10) is not applied to driving electrode(s) 12A of each of the cells PX1, PX2, and PX3. Further, the driving signal DS2 (see FIG. 10) is not applied to driving electrode (s) 12B of each of the cells PX1, PX2, and PX3. Further, a driving signal DS3 (see FIG. 12) is applied to driving electrode(s) 12C of each of the cells PX1, PX2, and PX3.

In case of the driving method illustrated in FIG. 11 and FIG. 12, it is possible to control the intensity of the vibration generated in each of the plurality of cells PX so as to become uniform as well as the drive system that has been described with reference to FIG. 4. For details, in each of the cells PX1, PX2, and PX3 among the plurality of cells PX illustrated in FIG. 11, the driving signal DS3 is applied to the driving electrode (s) 12C, and no driving signal is applied to the driving electrodes 12A and 12B. In this case, it is possible to propagate the vibration almost evenly over a wide area.

Further, in the driving method illustrated in FIG. 11 and FIG. 12, the organic piezoelectric film 20 (see FIG. 7) is driven by the driving electrodes 12C, to which the driving signal DS3 (see FIG. 12) having the smallest maximum voltage (amplitude) is applied, of the three driving electrodes 12A, 12B, and 12C arranged in each of the cells PX1, PX2, and PX3. In this case, the vibration generated in each of the plurality of cells PX is weaker (or smaller) than the vibration generated in the cell PX1 in the drive system that has been described with reference to FIG. 9. By uniformly generating the weak vibration over a wide range in this manner, it is possible to effectively stimulate the Merkel's discs 2 and the Meissner's corpuscles 3 illustrated in FIG. 1.

Further, in the example of the present embodiment, areas of the respective driving electrodes 12A, 12B, and 12C arranged in each of the plurality of cells PX in a plan view are different from each other. In the example illustrated in FIG. 9, in the plan view, the area of the driving electrodes 12A is larger than the area of the driving electrodes 12B and the area of the driving electrodes 12C. Further, the area of the driving electrodes 12B is larger than the area of the driving electrodes 12C. The respective areas of the driving electrodes 12A, 12B, and 12C become larger in proportion to the value of the maximum voltage (amplitude) of the applied signal. in a case where the areas of the driving electrodes 12 become larger in proportion to the maximum value of the applied voltage in this manner, it is possible to reduce impedance of each of the driving electrodes 12. Therefore, it is possible to reduce loss of electric power to drive the organic piezoelectric film 20 (see FIG. 7).

<Polarization of Organic Piezoelectric Element>

Figure 13:
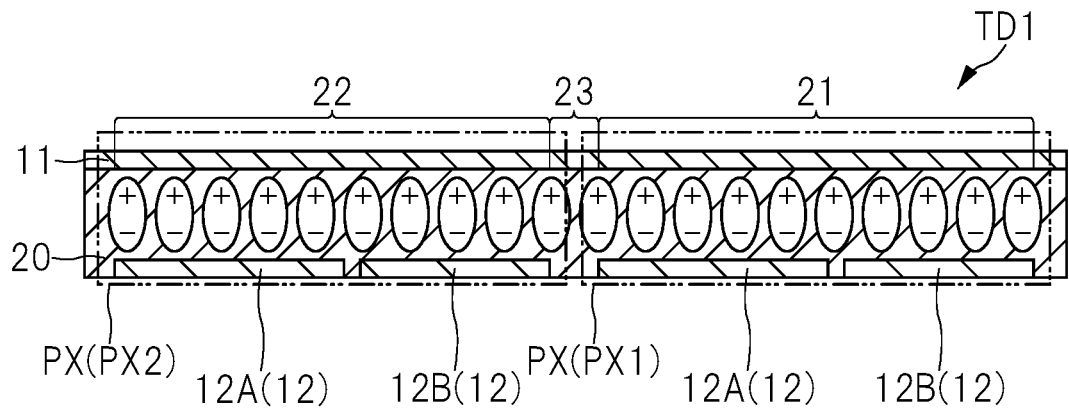
FIG. 13 is an enlarged sectional view schematically illustrating a polarized state of an organic piezoelectric film illustrated in FIG. 7.

Next, a piezoelectric property of an organic piezoelectric film 20 illustrated in FIG. 7 will be described. FIG. 13 is an enlarged sectional view schematically illustrating a polarized state of an organic piezoelectric film illustrated in FIG. 7. Further, FIG. 14 and FIG. 15 are enlarged sectional views illustrating modification examples with respect to FIG. 13.

The organic piezoelectric film 20 illustrated in FIG. 13 is formed by subjecting a polymer material film to polling processing (or polarization processing). The polling processing is a process in which an electric field is applied to the polymer material film from the outside to electrically polarize the polymer material film. As schematically illustrated in FIG. 13, in the organic piezoelectric film 20 after the polling processing, chains of monomers having electric dipoles are arranged along an arrangement direction of the plurality of driving electrodes 12. The electric field required for the polling processing can be applied using the plurality of driving electrodes 12 and the common electrode 11.

In the polling processing using the plurality of driving electrodes 12 and the common electrode 11, a potential of about 50 to 100 V, for example, is applied to each of the plurality of driving electrodes 12 illustrated in FIG. 13, and the ground potential (0 V) is applied to the common electrode 11. As illustrated in FIG. 13, in a case where a separation distance between the driving electrode 12A of the cell PX1 and the driving electrode 12B of the cell PX2 is short, the monomers having the electric dipoles are arranged in the organic piezoelectric film 20 almost uniformly. As described with reference to FIG. 8, in a case where each of the drive circuits DR1, DR2, and DR3 includes the high-side switch and the low-side switch connected to each other in series, it is possible to apply an arbitrary voltage to the organic piezoelectric film 20 by controlling a voltage between a gate and a source of the high-side switch.

Figure 14:
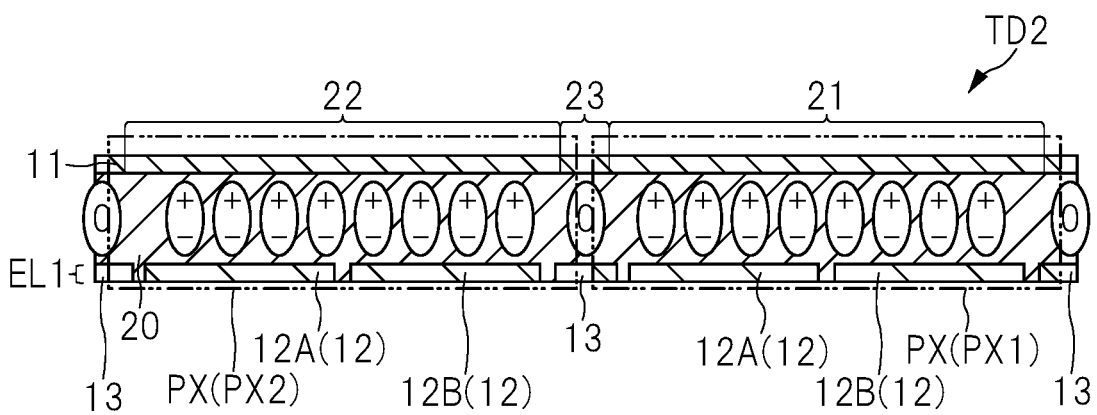
FIG. 14 is an enlarged sectional view illustrating a modification example with respect to FIG. 13.
Figure 15:
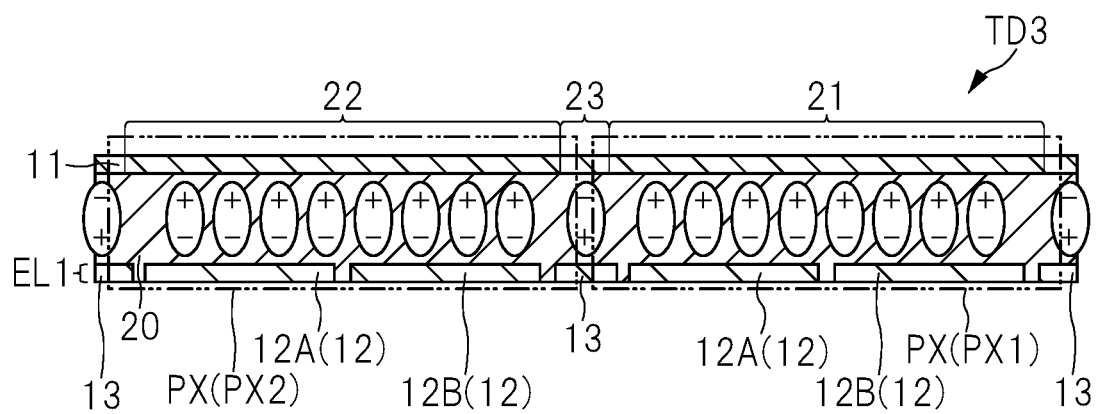
FIG. 15 is an enlarged sectional view illustrating another modification example with respect to FIG. 13.

Further, a tactile device TD2 illustrated in FIG. 14 is different from the tactile device TD1 illustrated in FIG. 13 in that the tactile device TD2 includes a region 23, in which an organic piezoelectric film 20 is not polarized, between cells PX1 and PX2 adjacent to each other. For details, the tactile device TD2 includes the cell PX1 and the cell PX2. The organic piezoelectric film 20 includes a region 21 overlapping with a plurality of driving electrodes 12 of the cell PX1, a region 22 overlapping with a plurality of driving electrodes 12 of the cell PX2, and a region 23 between the region 21 and the region 22. In each of the region 21 and the region 22, the organic piezoelectric film 20 is polarized in a thickness direction of the organic piezoelectric film 20. The organic piezoelectric film 20 is not polarized in the region 23. In other words, the organic piezoelectric film 20 in the tactile device TD2 includes electric dipoles divided into the respective cells PX, and a portion that is not polarized exists between the respective cells PX.

In case of the tactile device TD2, the organic piezoelectric film 20 is not polarized in the region 23 between the cell PX1 and the cell PX2. Thus, even though a voltage is applied to the cell PX1 or the cell PX2, it is hard for the organic piezoelectric film 20 in the region 23 to vibrate. For this reason, for example, it is hard for the organic piezoelectric film 20 in the cell PX2 to be affected by vibration generated by the adjacent cell PX1.

Further, the tactile device TD2 is also different from the tactile device TD1 illustrated in FIG. 13 in a layout of electrodes in an electrode layer EL1. In case of the tactile device TD2, an electrode 13 is arranged between the plurality of driving electrodes 12 of the cell PX1 and the plurality of driving electrodes 12 of the cell PX2 in the electrode layer EL1. The electrode 13 is an electrode electrically separated from each of the plurality of driving electrodes 12. In FIG. 14, the electrode 13 is arranged between a driving electrode 12A and a driving electrode 12B, but the electrode 13 is arranged so as to be surrounded by the plurality of cells PX in a plan view. In case of the tactile device TD2, in a step of carrying out polling processing, a potential of about 50 to 100 V is applied to each of the plurality of driving electrodes 12, for example, and a ground potential (0V) is applied to the common electrode 11 and the electrode 13. As a result, in the region 23, the organic piezoelectric film 20 becomes a state where it is hard for the organic piezoelectric film 20 to be polarized, a polarized structure as illustrated in FIG. 14 can be obtained.

Further, a tactile device TD3 illustrated in FIG. 15 is different from the tactile device TD1 illustrated in FIG. 13 in that the tactile device TD3 includes a region 23 in which an organic piezoelectric film 20 between cells PX1 and PX2 adjacent to each other is polarized so as to have an opposite polarity to that of each of the cells PX. For details, the tactile device TD3 includes the cell PX1 and cell PX2. The organic piezoelectric film 20 includes a region 21 overlapping with a plurality of driving electrodes 12 of the cell PX1, a region 22 overlapping with a plurality of driving electrodes 12 of the cell PX2, and a region between the region 21 and the region 22. The organic piezoelectric film 20 is polarized in a thickness direction of the organic piezoelectric film 20 in each of the region 21 and the region 22. In the region 23, the organic piezoelectric film 20 is polarized in a polarity opposite to a polarity of polarization in the region 21 and the region 22.

In case of the tactile device TD3, the organic piezoelectric film 20 in the region 23 between the cell PX1 and the cell PX2 is polarized in the opposite polarity to that of each of the cells PX. Thus, even though a voltage is applied to the cell PX1 or the cell PX2, it is further hard for the organic piezoelectric film 20 in the region 23 to vibrate. For this reason, for example, it is hard for the organic piezoelectric film 20 in the cell PX2 to be affected by vibration generated by the adjacent cell PX1.

Further, an electrode layout in the electrode layer EL1 of the tactile device TD3 is similar to an electrode layout in the electrode layer EL1 of the tactile device TD2 illustrated in FIG. 14. In case of the tactile device TD3, in a step of carrying out polling processing, a potential of about 50 to 100 V is applied to each of the plurality of driving electrodes 12, for example, and a ground potential (0 V) is applied to a common electrode 11. Further, a potential of about −10 to 30 V is applied to an electrode 13. As a result, in the region 23, the organic piezoelectric film 20 becomes a state where it is easy for the organic piezoelectric film 20 to be polarized in the opposite polarity to that in the regions 21 and 22, and a polarized structure as illustrated in FIG. 15 can be obtained.

In the tactile device TD2 illustrated in FIG. 14 and the tactile device TD3 illustrated in FIG. 15, an example in which the electrode 13 is arranged in the electrode layer EL1 has been described. However, the electrode 13 may be arranged in a layer different from the plurality of driving electrodes 12 (for example, a layer between the electrode layer EL1 and the drive circuit layer DRCL illustrated in FIG. 7). In this case, a part of the electrode 13 arranged in the layer different from the electrode layer EL1 may overlap with a part of the plurality of driving electrodes 12 arranged in the electrode layer EL1 in the thickness direction thereof.

Further, in the tactile device TD2 illustrated in FIG. 14 and the tactile device TD3 illustrated in FIG. 15, the embodiment in which the electrode 13 is arranged between the adjacent cells PX has been described. However, as a modification example, the electrode 13 may be arranged in each region between the plurality of driving electrodes 12A and the plurality of driving electrodes 12B. In this case, each of sub cells, which are sandwiched between the plurality of driving electrodes 12A and 12B corresponding to the region 21 or 22 and the common electrode 11 therebetween, becomes a sub vibration element that vibrates independently from each other. For example, when a region that is not polarized or is polarized to the opposite polarity between the cell PX1 illustrated in FIG. 6 and each of the driving electrodes 12A, 12B, and 12C and if a driving signal is applied to only the driving electrodes 12A and no driving signal is applied to the driving electrodes 12B and 12C, then only the sub cell overlapping with the driving electrode 12A vibration, and it is hard for the other sub cells respectively facing the driving electrodes 12B and 12C to vibrate. The tactile device TD2 illustrated in FIG. 14 and the tactile device TD3 illustrated in FIG. 15 is similar to the tactile device TD1 illustrated in FIG. 13 except for the above differences. For this reason, duplicate explanations thereof will be omitted.

Further, in the tactile device illustrated in FIG. 6, the embodiment in which the driving electrodes 12A, 12B, and 12C respectively having a different plane area are arranged in each of the plurality of cells PX has been exemplified and described. However, there are various modification examples in the number of the driving electrodes 12, a shape of the driving electrode 12, or a layout of the driving electrodes 12 included in the plurality of cells PX. For example, if the number of the driving electrodes 12 included in the plurality of cells PX is at least two or more, it is possible to generate vibrations each having the different intensity in the cells PX adjacent to each other. Further, if the number of the driving electrodes 12 included in the plurality of cells PX is four or more, it is possible to control the intensity of the vibration more finely.

Further, the example in which the driving signal DS1 is applied to the cell PX1, the driving signals DS1 and DS2 are applied to the cells PX2, and the driving signals DS1, DS2, and DS3 are applied to the cells PX3 has been described in the example illustrated in FIG. 10. However, as a variation of the method of applying the driving signal, there is a method of applying the driving signals DS1 and DS3 thereto, but not applying the driving signal DS2 thereto. By combining this variation thereto, it is possible to control the intensity of the vibration more finely.

Figure 16:
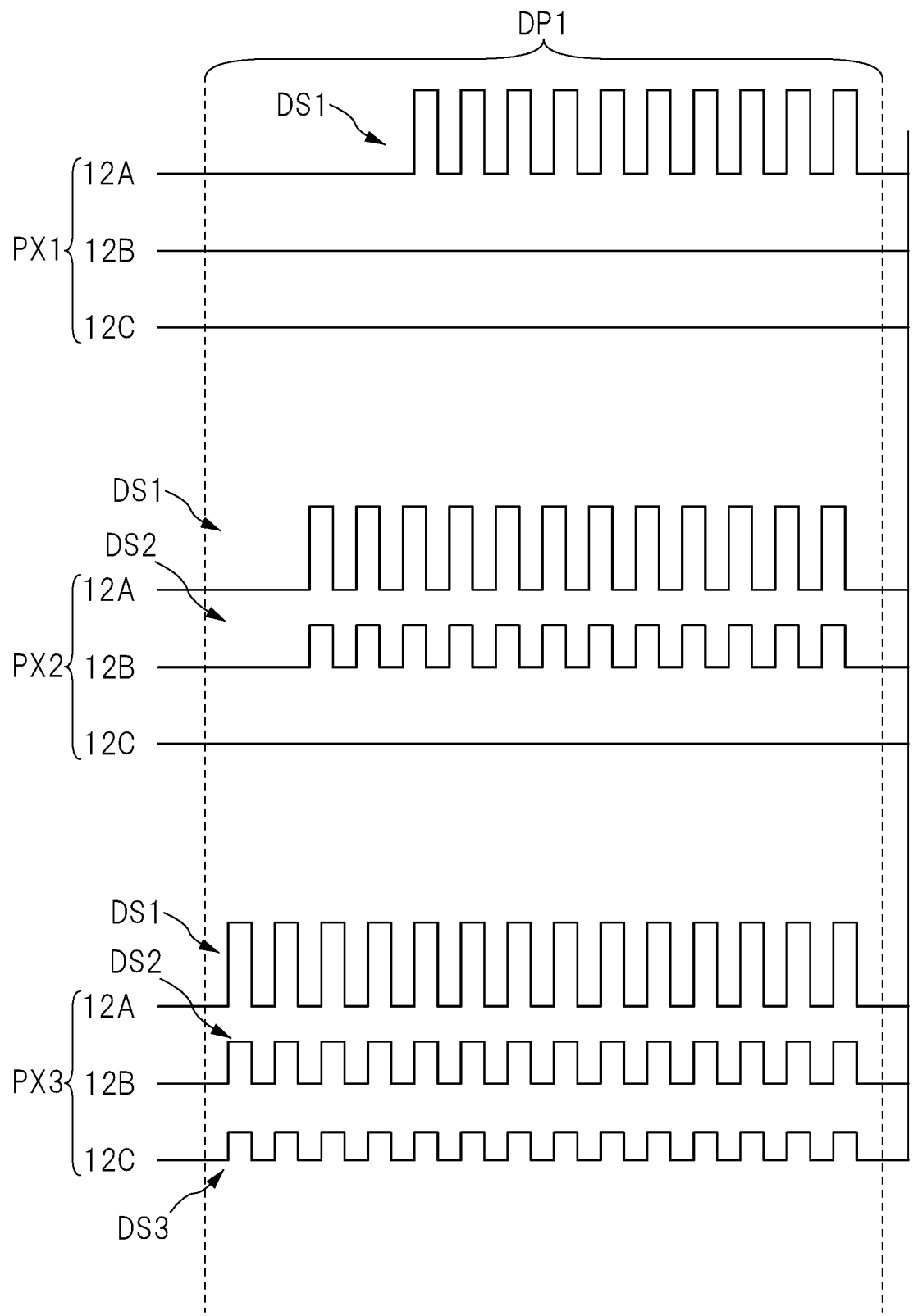
FIG. 16 is an explanatory diagram illustrating a modification example with respect to FIG. 10.

Further, in the example of the driving method that has been described with reference to FIG. 10 and FIG. 12, the case where the delay times (phases) of the driving signals respectively applied to the cell PX1, PX2, and PX3 are all the same as each other has been described. However, as a modification example of the driving method, as illustrated in FIG. 16, driving signals are respectively applied to the plurality of cells PX1, PX2, and PX3 with different delay times. FIG. 16 is an explanatory diagram illustrating a modification example with respect to FIG. 10. In case of the driving method illustrated in FIG. 16, a delay time until a driving signal DS1 is applied to a driving electrode 12A of a cell PX1 is longer than a delay time until the driving signal DS1 is applied to driving electrodes 12A of cells PX2 and PX3. Further, the delay time until the driving signal DS1 is applied to the driving electrodes 12A of the cell PX3 is shorter than the delay time until the driving signal DS1 is applied to the driving electrodes 12A of the cells PX1 and PX2. In a case where timing of applying the driving signal to the plurality of cells PX1, PX2, and PX3 is different from each other in this manner, timing when vibration is propagated changes.

As has been described with referent to FIG. 9 and FIG. 10, in addition to presence or absence of application of the driving signal to the plurality of driving electrodes 12A, 12B, and 12C arranged in each of the plurality of cells PX, as described above, it is possible to control the intensity of the vibration more finely by controlling the timing of applying the driving signal. On the other hand, as illustrated in FIG. 10, in a case where the timing of applying the driving signal to the plurality of cells PX1, PX2, and PX3 matches with each other (in other words, in a case where the delay times are equal to each other), the control thereof is simplified.

Further, in the example illustrated in FIG. 7, the embodiment in which each of the plurality of driving electrodes and the common electrode face to each other via the organic piezoelectric film 20 has been described. However, there are various modification examples in the layout of the electrodes in the thickness direction of the tactile device TD1. For example, the common electrode of each of the plurality of driving electrodes may be arranged so as to face each other without interposing the organic piezoelectric film 20, and the organic piezoelectric film 20 may be arranged so as to cover the driving electrodes. However, it is easier to control a vibration direction of the organic piezoelectric film 20 when a voltage is applied to a thickness direction of the organic piezoelectric film 20.

As described above, the representative embodiment and the modification examples have been described with reference to the drawings. However, the techniques described above can further be applied to various modification examples. For example, the plurality of modification examples may be applied in combination with each other.

Various modifications and alterations can be conceived by a person having ordinary skill in the art within the spirit of the present invention, and it is understood that such modifications and alterations are also encompassed within the scope of the present invention. For example, a person having ordinary skill in the art can suitably modify the above-described embodiment by addition, deletion, or design change of components, or by addition, omission, or condition change of steps. Such modifications are also encompassed within the scope of the present invention as long as they include the gist of the present invention.

INDUSTRIAL APPLICABILITY

The present invention can be used for a tactile device.

What is claimed is:
1. A tactile device comprising:
   a substrate provided with a first surface;
   an organic piezoelectric film arranged on the first surface side of the substrate, the organic piezoelectric film having a piezoelectric property;
   a plurality of electrodes arranged on the first surface of the substrate; and
   a plurality of drive circuits arranged between the substrate and the organic piezoelectric film, each of the drive circuits being configured to apply a drive voltage to the organic piezoelectric film during a piezoelectric driving period for driving the organic piezoelectric film,
   wherein, in a plan view, the organic piezoelectric film is divided into a plurality of cells,
   wherein the plurality of electrodes includes:
   a common electrode arranged across the plurality of cells in the plan view, a reference potential being supplied to the common electrode during the piezoelectric driving period; and
   a plurality of driving electrodes respectively arranged in the plurality of cells in the plan view,
   wherein the plurality of drive circuits includes:

a first drive circuit capable of supplying a first driving
signal during the piezoelectric driving period; and
a second drive circuit capable of supplying a second
driving signal during the piezoelectric driving period,
the second driving signal being different from the first
driving signal,
wherein the plurality of driving electrodes includes:
a first driving electrode connected to the first drive circuit;
and
a second driving electrode electrically separated from the
first driving electrode and connected to the second
drive circuit, and
wherein the first driving electrode and the second driving
electrode are arranged in each of the plurality of cells.

2. The tactile device according to claim 1,
wherein a maximum voltage of the first driving signal is
different from a maximum voltage of the second driving signal.

3. The tactile device according to claim 2,
wherein, in the plan view, an area of the first driving
electrode is different from an area of the second driving
electrode.

4. The tactile device according to claim 1,
wherein each of the first drive circuit and the second drive
circuit includes a thin film transistor.

5. The tactile device according to claim 2,
wherein each of the first drive circuit and the second drive
circuit includes:
a high-side transistor connected to a power line to which
a first potential higher than the reference potential is
applied; and
a low-side transistor connected to a reference potential
line to which the reference potential is applied and
connected to the high-side transistor in series, and
wherein each of the first driving electrode and the second
driving electrode is connected between the high-side
transistor and the low-side transistor.

6. The tactile device according to claim 1,
wherein the plurality of cells has a first cell, a second cell,
and a third cell positioned between the first cell and the
second cell,
wherein the plurality of drive circuits includes a third
drive circuit capable of supplying a third driving signal
whose potential is lower than that of each of the first
driving signal and the second driving signal during the
piezoelectric driving period,
wherein the plurality of driving electrodes is electrically
separated into the first driving electrode and the second
driving electrode and is arranged in the same cell as the
first and second driving electrodes, and includes a third
driving electrode connected to the third drive circuit,
and
wherein during a first piezoelectric driving period of a
plurality of the piezoelectric driving periods for driving
the organic piezoelectric film,
the first driving signal is applied to the first driving
electrode of each of the first, second, and third cells;
the second driving signal whose potential is lower than
that of the first driving signal is applied to the second
driving electrode of each of the second and third cells;
the third driving signal whose potential is lower than that
of the first driving signal is applied to the third driving
electrode of the second cell;
the second driving signal is not applied to the second
driving electrode of the first cell; and
the third driving signal is not applied to the third driving
electrode of each of the first and third cells.

7. The tactile device according to claim 6,
wherein during a second piezoelectric driving period of
the plurality of piezoelectric driving periods,
the first driving signal is not applied to the first driving
electrode of each of the first, second, and third cells;
the second driving signal is not applied to the second
driving electrode of each of the first, second, and third
cells; and
the third driving signal is applied to the third driving
electrode of each of the first, second, and third cells.

8. The tactile device according to claim 1,
wherein the common electrode is arranged so as to face
each of the plurality of driving electrodes via the
organic piezoelectric film.

9. The tactile device according to claim 1,
wherein the plurality of cells has a first cell and a second
cell,
wherein the organic piezoelectric film includes:
a first region overlapping with the plurality of driving
electrodes of the first cell;
a second region overlapping with the plurality of driving
electrodes of the second cell; and
a third region between the first region and the second
region,
wherein the organic piezoelectric film polarizes in a
thickness direction of the organic piezoelectric film in
each of the first region and the second region, and
wherein the organic piezoelectric film does not polarize in
the third region.

10. The tactile device according to claim 1,
wherein the organic piezoelectric film includes:
a first region facing the first driving electrode;
a second region facing the second driving electrode; and
a third region between the first region and the second
region,
wherein the organic piezoelectric film polarizes in a
thickness direction of the organic piezoelectric film in
each of the first region and the second region, and
wherein in the third region, the organic piezoelectric film
polarizes in a polarity opposite to a polarity of polarization in the first region and the second region.

11. The tactile device according to claim 2,
wherein each of the first drive circuit and the second drive
circuit includes a thin film transistor.

12. The tactile device according to claim 3,
wherein each of the first drive circuit and the second drive
circuit includes a thin film transistor.

13. The tactile device according to claim 2,
wherein the plurality of cells has a first cell, a second cell,
and a third cell positioned between the first cell and the
second cell,
wherein the plurality of drive circuits includes a third
drive circuit capable of supplying a third driving signal
whose potential is lower than that of each of the first
driving signal and the second driving signal during the
piezoelectric driving period,
wherein the plurality of driving electrodes is electrically
separated into the first driving electrode and the second
driving electrode and is arranged in the same cell as the
first and second driving electrodes, and includes a third
driving electrode connected to the third drive circuit,
and
wherein during a first piezoelectric driving period of a
plurality of the piezoelectric driving periods for driving
the organic piezoelectric film,
the first driving signal is applied to the first driving
electrode of each of the first, second, and third cells;

the second driving signal whose potential is lower than that of the first driving signal is applied to the second driving electrode of each of the second and third cells;

the third driving signal whose potential is lower than that of the first driving signal is applied to the third driving electrode of the second cell;

the second driving signal is not applied to the second driving electrode of the first cell; and the third driving signal is not applied to the third driving electrode of each of the first and third cells.

14. The tactile device according to claim 3, wherein the plurality of cells has a first cell, a second cell, and a third cell positioned between the first cell and the second cell, wherein the plurality of drive circuits includes a third drive circuit capable of supplying a third driving signal whose potential is lower than that of each of the first driving signal and the second driving signal during the piezoelectric driving period, wherein the plurality of driving electrodes is electrically separated into the first driving electrode and the second driving electrode and is arranged in the same cell as the first and second driving electrodes, and includes a third driving electrode connected to the third drive circuit, and wherein during a first piezoelectric driving period of a plurality of the piezoelectric driving periods for driving the organic piezoelectric film, the first driving signal is applied to the first driving electrode of each of the first, second, and third cells;

the second driving signal whose potential is lower than that of the first driving signal is applied to the second driving electrode of each of the second and third cells;

the third driving signal whose potential is lower than that of the first driving signal is applied to the third driving electrode of the second cell;

the second driving signal is not applied to the second driving electrode of the first cell; and the third driving signal is not applied to the third driving electrode of each of the first and third cells.

15. The tactile device according to claim 2, wherein the plurality of cells has a first cell and a second cell, wherein the organic piezoelectric film includes:

a first region overlapping with the plurality of driving electrodes of the first cell;

a second region overlapping with the plurality of driving electrodes of the second cell; and a third region between the first region and the second region, wherein the organic piezoelectric film polarizes in a thickness direction of the organic piezoelectric film in each of the first region and the second region, and wherein the organic piezoelectric film does not polarize in the third region.

16. The tactile device according to claim 3, wherein the plurality of cells has a first cell and a second cell, wherein the organic piezoelectric film includes:

a first region overlapping with the plurality of driving electrodes of the first cell;

a second region overlapping with the plurality of driving electrodes of the second cell; and a third region between the first region and the second region, wherein the organic piezoelectric film polarizes in a thickness direction of the organic piezoelectric film in each of the first region and the second region, and wherein the organic piezoelectric film does not polarize in the third region.

17. The tactile device according to claim 2, wherein the organic piezoelectric film includes:

a first region facing the first driving electrode;

a second region facing the second driving electrode; and a third region between the first region and the second region, wherein the organic piezoelectric film polarizes in a thickness direction of the organic piezoelectric film in each of the first region and the second region, and wherein in the third region, the organic piezoelectric film polarizes in a polarity opposite to a polarity of polarization in the first region and the second region.

18. The tactile device according to claim 3, wherein the organic piezoelectric film includes:

a first region facing the first driving electrode;

a second region facing the second driving electrode; and a third region between the first region and the second region, wherein the organic piezoelectric film polarizes in a thickness direction of the organic piezoelectric film in each of the first region and the second region, and wherein in the third region, the organic piezoelectric film polarizes in a polarity opposite to a polarity of polarization in the first region and the second region.

* * * * *